United States Patent
Toba et al.

(10) Patent No.: US 8,352,093 B2
(45) Date of Patent: Jan. 8, 2013

(54) INTRA-AREA ENVIRONMENTAL CONTROL SYSTEM AND INTRA-AREA ENVIRONMENTAL CONTROL METHOD

(75) Inventors: Minako Toba, Tokyo (JP); Yasuhide Mori, Kawasaki (JP); Ken Naono, Tokyo (JP); Masashi Egi, Machida (JP); Takao Sakurai, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 307 days.

(21) Appl. No.: 12/908,621

(22) Filed: Oct. 20, 2010

(65) Prior Publication Data

US 2011/0093126 A1 Apr. 21, 2011

(30) Foreign Application Priority Data

Oct. 21, 2009 (JP) ................................. 2009-242473

(51) Int. Cl.
- *G05D 3/12* (2006.01)
- *G05D 5/00* (2006.01)
- *G05D 9/00* (2006.01)
- *G05D 11/00* (2006.01)
- *G05D 17/00* (2006.01)
- *G05D 23/00* (2006.01)
- *G05B 21/00* (2006.01)
- *G05B 13/00* (2006.01)
- *G05B 15/00* (2006.01)
- *G01M 1/38* (2006.01)

(52) U.S. Cl. ......... 700/295; 700/277; 700/278; 236/1 B; 236/1 C

(58) Field of Classification Search ..................... 700/11, 700/12, 17, 275–278, 286, 291, 295, 296; 340/870.01, 870.16, 870.17; 315/312; 236/1 R, 236/1 B, 1 C See application file for complete search history.

(56) References Cited

U.S. PATENT DOCUMENTS

| | | | | |
|---|---|---|---|---|
| 6,295,823 | B1* | 10/2001 | Odom et al. | 62/176.6 |
| 7,295,119 | B2* | 11/2007 | Rappaport et al. | 340/572.4 |
| 7,953,518 | B2* | 5/2011 | Kansal et al. | 700/295 |
| 2007/0241203 | A1* | 10/2007 | Wagner et al. | 236/1 C |
| 2007/0244572 | A1* | 10/2007 | Farr | 700/12 |
| 2008/0231468 | A1* | 9/2008 | Myllymaki | 340/870.17 |
| 2010/0235004 | A1* | 9/2010 | Thind | 700/277 |
| 2010/0250009 | A1* | 9/2010 | Lifson et al. | 700/278 |
| 2011/0061015 | A1* | 3/2011 | Drees et al. | 715/771 |
| 2011/0093126 | A1* | 4/2011 | Toba et al. | 700/291 |
| 2012/0086363 | A1* | 4/2012 | Golding et al. | 315/312 |

FOREIGN PATENT DOCUMENTS

| | | |
|---|---|---|
| JP | 5-141743 A | 6/1993 |
| JP | 10-141735 A | 5/1998 |
| JP | 10-326126 A | 12/1998 |
| JP | 2000-205948 A | 7/2000 |
| JP | 2006-234243 A | 9/2006 |

* cited by examiner

*Primary Examiner* — Crystal J Barnes-Bullock
(74) *Attorney, Agent, or Firm* — Crowell & Moring LLP

(57) ABSTRACT

An environmental control system according to the present invention is a system for controlling environmental devices by which a work status and a behavior status are monitored and the environmental devices are finely controlled in accordance with the statuses to improve comfort. The environmental control system includes a communication unit, a unit for detecting environments, a unit for detecting a work status, a unit for obtaining power consumption, a unit for determining the control of a device, and a unit for transmitting a control signal, and enables fine control in accordance with a work type.

20 Claims, 20 Drawing Sheets

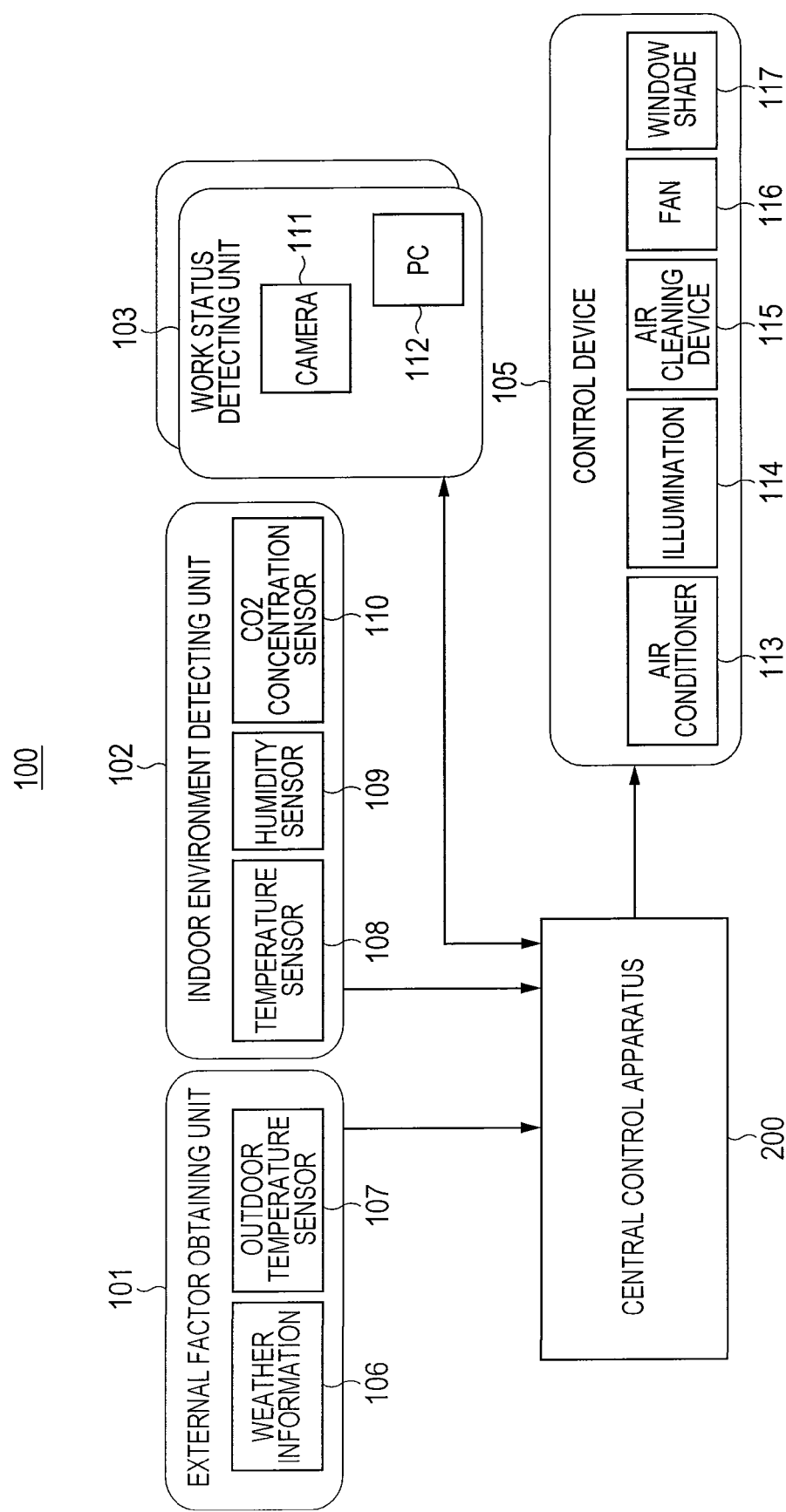

FIG. 5

| | WORK STATUS | | |
|---|---|---|---|
| 1 | PRESENCE | PC OPERATION | 502 |
| 2 | | SPECIFIC OPERATION A | 503 |
| 3 | | SPECIFIC OPERATION B | 504 |
| 4 | | CALLING | 505 |
| 5 | | WORKING ON THE DESK | 506 |
| 6 | | TALKING | 507 |
| | | ... | |
| 7 | SIGN/GESTURE | SLEEPING | 508 |
| 8 | | ... | |
| 9 | ABSENCE | | 509 |
| 10 | IN-A-MEETING | | 510 |
| 11 | MEETING-A-CLIENT | | 511 |
| | ... | | |

(501 labels the WORK STATUS header row)

FIG. 7

701(323) DESCRIPTION EXAMPLE OF CONTROL POLICY SETTING SCRIPT

```
1  ########## DEFINITION ##########   ~702
2
3  #### EVALUATION INDEX DEFINITION ####   ~703
4
5  ene_save_level//ENERGY SAVING LEVEL INDEX
6  comfort_level//COMFORT LEVEL INDEX
7  efficiency_level//PRODUCTION EFFICIENCY INDEX
8
9  #### VARIABLE DEFINITION ####   ~704
10
11 value_sensor_temperature//ACTUAL MEASUREMENT VALUE OF TEMPERATURE
12 value_sensor_humidity//ACTUAL MEASUREMENT VALUE OF HUMIDITY
13 value_sensor_co2//ACTUAL MEASUREMENT VALUE OF CO2
14 value_CPU//ACTUAL MEASUREMENT VALUE OF CPU
15 ...
16
17 value_ene_save//ACTUAL MEASUREMENT VALUE OF ENERGY SAVING LEVEL
18 value_comfort//ACTUAL MEASUREMENT VALUE OF COMFORT LEVEL
19 value_efficiency//ACTUAL MEASUREMENT VALUE OF PRODUCTION EFFICIENCY
20
21 work_type//ANALYZED WORK
22
23 time//TIME
24 area_control//AREA CONTROL METHOD
25
26 #### CONTROL VALUE DEFINITION ####   ~705
27
28 control_temperature//CONTROL TARGET VALUE OF TEMPERATURE
29 control_humidity//CONTROL TARGET VALUE OF HUMIDITY
30 control_co2//CONTROL TARGET VALUE OF CO2
31 control_CPU//CONTROL TARGET VALUE OF CPU
32 ...
33 ########## CONTROL POLICY ##########   ~706
34
35 #### EVALUATION INDEX CONDITION ####   ~707
36
37 priority(0) = ene_save_level
38 priority(1) = comfort_level
39 priority(2) = efficiency_level
40
41 ene_save_level < 5
42 -1.5 < comfort_level > +1.5
43 efficiency_level > 8
44
45 #### WORK ADAPTIVE CONDITION ####   ~708
46
47 If (work_type = app_cad)
48 then (control_CPU = MAX)
49
50 If (work_type = sleep)
51 then (control_temperature = value_sensor_temperature -2)
52
53 If (work_type = absent)
54 then (ene_save_level = MIN)
55
56 If (1145 < time < 1245)
57 then (control_temp < 28)
58
59 #### AREA ADAPTIVE CONDITION ####   ~709
60
61 area_control = average
62
63 If ((max(value_comfort) - min(value_comfort)) > 15)
64 then RECALCULATION
```

FIG. 13

| | AIR CONDITIONER | | ILLUMINATION | | WINDOW SHADE | | PC/ MONITOR | | AIR CLEANING DEVICE | | FAN |
|---|---|---|---|---|---|---|---|---|---|---|---|
| 1 | ON | 1 | ON | 1 | OPEN | 1 | ACTIVATE | 1 | ON | 1 | ON |
| 2 | OFF | 2 | OFF | 2 | CLOSE | 2 | PAUSE | 2 | OFF | 2 | OFF |
| 3 | RAISE TEMPERATURE | 3 | INCREASE ILLUMINATION INTENSITY | 3 | ... | 3 | SHUTDOWN | 3 | HIGH | 3 | HIGH |
| 4 | LOWER TEMPERATURE | 4 | DECREASE ILLUMINATION INTENSITY | 4 | | 4 | REDUCE CPU SPEED | 4 | LOW | 4 | LOW |
| 5 | ... | 5 | COLOR TEMPERATURE | 5 | | 5 | ... | 5 | ... | 5 | ... |
| 6 | | 6 | ... | 6 | | 6 | | 6 | | 6 | |
| 7 | | 7 | | 7 | | 7 | | 7 | | 7 | |
| 8 | | 8 | | 8 | | 8 | | 8 | | 8 | |

Columns: 1302, 1303, 1304, 1305, 1306, 1307. Table 1301.

FIG. 14

DISPLAY ITEM ON EACH CLIENT PC

| 1 | ALERT DISPLAY | "LET'S TAKE A BREAK" |
|---|---|---|
| 2 | | "LET'S EXERCISE" |
| 3 | | "LET'S OPEN THE WINDOW" |
| 4 | | "LET'S MOVE TO DESK X" |
| 5 | | "LET'S GO HOME" |
| 6 | PRESENTATION ON INPUT SCREEN | RAISE/LOWER TEMPERATURE |
| 7 | | ... |
| 8 | ... | |

PRESENTATION OF WORK STATUS

INTRA-AREA ENVIRONMENTAL CONTROL SYSTEM AND INTRA-AREA ENVIRONMENTAL CONTROL METHOD

CLAIM OF PRIORITY

The present application claims priority from Japanese Patent Application JP 2009-242473 filed on Oct. 21, 2009, the content of which is hereby incorporated by reference into this application.

FIELD OF THE INVENTION

The present invention relates to an intra-area environmental control system and an intra-area environmental control method, and particularly to an environmental control system and an environmental control method in which a relation between work statuses of persons and environmental control devices such as air conditioning devices and illumination devices in an area is comprehensively considered.

BACKGROUND OF THE INVENTION

As a conventional and general control method of environmental control devices, an air conditioner is controlled such that the temperature in a room (area) is always kept at a predetermined target temperature. However, there has been also proposed a control method for energy saving such as an intermittent control under which an air conditioner is repeatedly operated and stopped at a certain period of time. Further, Japanese Patent Application Laid-Open No. 2000-205948 discloses a control method in which the presence/absence of persons is recognized by a sensor to activate a device such a television when persons are present and to stop the operation of the device when persons are absent. Japanese Patent Application Laid-Open Publication No. H10-326126 discloses a control method for reducing power consumption in which the presence/absence of persons is recognized by a sensor to activate a personal computer in a normal mode when persons are present and to set a personal computer in an energy saving mode when persons are absent. Further, Japanese Patent Application Laid-Open Publication No. 2006-234243 discloses a control method for performing an environmental control in consideration of comfort and workability in which an area is divided into a plurality of zones, the presence/absence of persons is recognized for each zone, and environmental factors such as a temperature, humidity, and illumination are individually controlled in not only a zone where persons are absent, but also the adjacent zones. Furthermore, Japanese Patent Application Laid-Open Publication No. H05-141743 discloses an environmental control apparatus for controlling equipment in which in accordance with an energy saving level, a comfort level is set low when the energy saving level is high and a comfort level is set high when the energy saving level is low, and the comfort level is calculated using, for example, a PMV calculating method. In addition, Japanese Patent Application Laid-Open Publication No. H10-141735 discloses a method in which some comfortable area patterns are preliminarily stored in a host computer for each of an air-conditioning environment, an illumination environment, and a noise environment based on work types carried out in a space to be environmentally controlled, and the comfortable area patterns are changed for each work type to control the space.

SUMMARY OF THE INVENTION

In a general office, the same work is not always carried out, but plural kinds of work are carried out. However, according to the study of the inventors, the conditions of comfort levels differ depending on the situations of behavior in work. Thus, it is conceivable that different control methods of environmental control devices should be provided. However, there has been no idea of changing a control method of comfort levels in accordance with the situations of behavior in work. In an example of Japanese Patent Application Laid-Open Publication No. H10-141735, the comfortable area patterns are changed for each work type to control the space on the assumption that proper ranges of a temperature, illumination, a noise where persons feel comfortable differ depending on manual work, intellectual work and a space for refresh. However, the work type of each person is not uniform even in, for example, a space where intellectual work is carried out. Accordingly, the respective control methods described in the related Art involve the following problems.

(1) The presence/absence of persons in an area is detected, but the control method of the environmental control devices is not adapted to situations of behavior in work of each person. Thus, the entire comfort of the area is not sufficiently provided.

(2) There is no method or index for recognizing the comfort levels in accordance with behavior in work of each person existing in the area.

(3) For a manager of environmental control devices, there is no method of easily setting control policies for the environmental control devices on the basis of plural viewpoints including comfort levels and energy saving levels.

In order to address the problems involved in the related art, an object of the present invention is to propose an environmental control system provided with the following functions.

(1) The presence/absence and the work status of each person in an intra-area are monitored, and the area is controlled in accordance with the work status of each person, so that comfort can be improved in accordance with the work of each person.

(2) Indexes for evaluating energy saving effects, comfort, and production efficiency are defined, and transition of the respective indexes in the area can be presented on a screen.

(3) Control policies for environmental control devices on the basis of plural viewpoints including comfort levels and energy saving levels can be set in scripts.

The following is a representative configuration of the present invention. The present invention provides an intra-area environmental control system which includes plural environmental devices that control environments in an area, and a control apparatus that monitors conditions in the area to control the respective environmental devices in accordance with the conditions in the area, the control apparatus including: a unit for setting control policies for the respective environmental devices in accordance with a work status in the area on the basis of predetermined evaluation indexes; a unit for obtaining information about power consumption of the respective environmental devices; a unit for detecting environmental information of the area; a unit for detecting the work status of each person in the area; and an evaluation index calculating and control device determining unit, wherein the evaluation indexes of the respective environmental devices are calculated on the basis of the environmental information of the area and the information about the power consumption of the respective environmental devices, a combination of controls of the respective environmental devices adapted to the control policies is determined on the basis of the calculated evaluation indexes, the set control policies, and the work status of each person in the area, and the respective environmental devices are controlled on the basis of the determined combination.

According to an aspect of the present invention, the work status of each office worker is monitored and environmental control devices are finely controlled in accordance with the work status of each office worker, so that it is possible to improve the entire comfort in the area.

BRIEF DESCRIPTION OF THE DRAWINGS

FIG. 1 is a diagram for showing an example of an entire configuration of an environmental control system according to an embodiment of the present invention;

FIG. 5 is a diagram for showing an example of a work status table for office workers held by a data holding unit of the central control apparatus;

FIG. 7 is a diagram for showing an example of descriptions of control policy setting scripts for devices in the embodiment;

FIG. 13 is a diagram for showing an example of a device control table held by the data holding unit of the central control apparatus;

FIG. 14 is a diagram for showing an example of a table of items displayed on a client PC (Personal Computer);

DETAILED DESCRIPTION OF THE EMBODIMENT

Figure 2A:
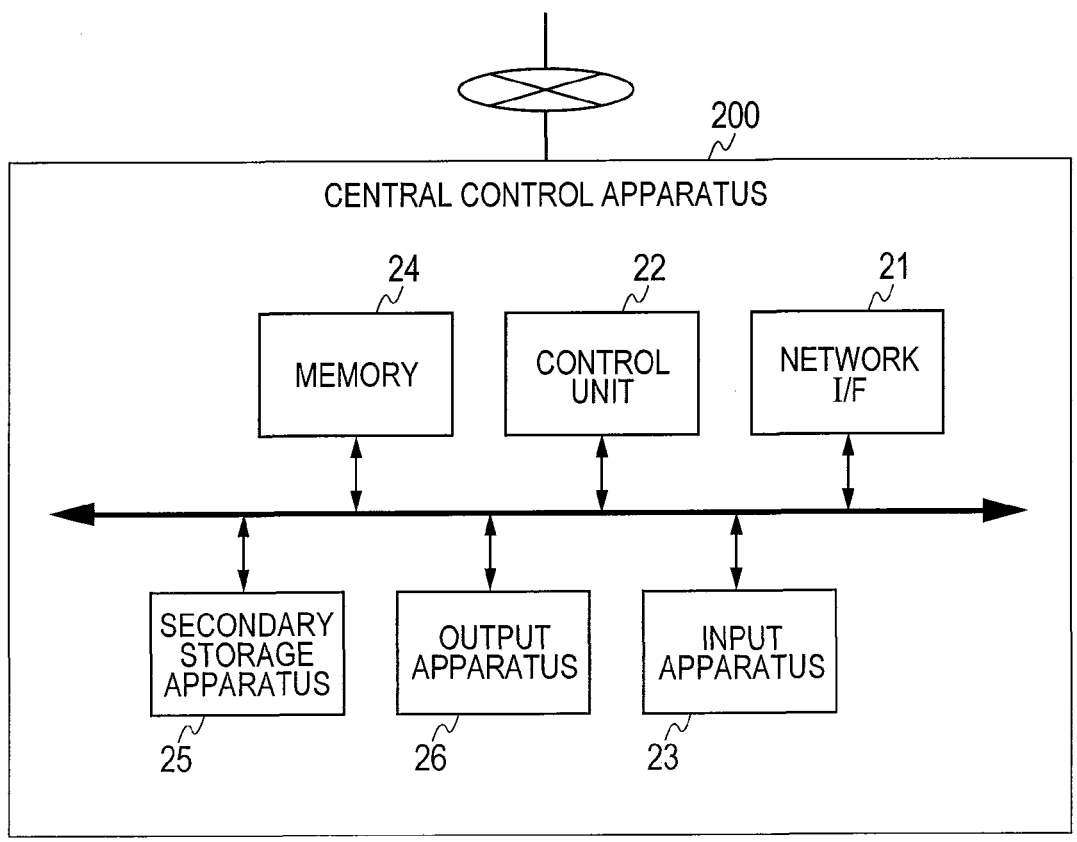
FIG. 2A is a diagram for showing an example of a hardware configuration of a central control apparatus in FIG. 1.

An environmental control system according to the present invention is a system for controlling environmental devices by which the work status and behavior status of each person in a room of an office building or the like are monitored and the environmental devices are finely controlled in accordance with the statuses to improve comfort. The environmental control system includes a communication unit, a unit for detecting environments, a unit for detecting a work status, a unit for obtaining power consumption, a unit for determining the control of a device, and a unit for transmitting a control signal, whereby enables fine, control in accordance with a work type. In the following description, there will be described an example in which a room of an office building or the like is controlled for each area. Specifically, the environmental control system of the present invention controls environmental devices in which energy saving and comfort are satisfied in an area. The environmental devices include an air conditioner, illumination equipment, an air cleaning device, and a window shade and the like all of which control environments in the area.

It should be noted that the environmental control system of the present invention can be applied to not only office buildings, but also various facilities such as school buildings and commercial facilities where a number of office workers, students, or workers (hereinafter, simply referred to as office workers) carry out various work, operations, studies and the like (hereinafter, simply referred to as work) in at least one area.

According to an aspect of the present invention, the following effects can be obtained.

(1) The work status of each office worker is monitored and environmental control devices are finely controlled in accordance with the work status, so that it is possible to improve the entire comfort in the area.

(2) Indexes for evaluating energy saving effects, comfort, and production efficiency are defined, and the priorities and allowable ranges of the respective evaluation indexes can be arbitrarily controlled by presenting transition of these indexes on a screen.

(3) Detailed control policies can be easily set using scripts.

Hereinafter, an example of an embodiment of an environmental control system according to the present invention will be described using the drawings.

FIG. 1 shows an example of an outline of a system according to the environmental control system of the embodiment. An environmental control system 100 of the embodiment includes an external factor obtaining unit 101, an indoor environment detecting unit 102, a work status detecting unit 103, a central control apparatus (control apparatus) 200, and a control device 105. The respective units are coupled to the central control apparatus 200 through a communication network in the facilities to allow data transmission/reception. The external factor obtaining unit 101 includes a weather information obtaining unit 106 and an outdoor temperature sensor 107. The weather information obtaining unit 106 is coupled to a communication network (not shown in the drawing) such as the Internet to obtain weather information from a weather information distribution service provider or the like of the outside. The outdoor temperature sensor 107 obtains an outdoor temperature of the position where the office building is located. The indoor environment detecting unit 102 includes a temperature sensor 108 which obtains a temperature in a room of the office building, a humidity sensor 109 which obtains humidity, and a $CO_2$ concentration sensor 110 which obtains a CO2 concentration. The work status detecting unit 103 includes a camera 111 and a PC 112, and is installed for each office worker in the embodiment. The PC 112 is used by an office worker who is a target of work status detection, and the camera 111 is coupled to the PC through, for example, a USB to obtain an image of the office worker. The control device 105 controlled by the central control apparatus 200 includes an air conditioner 113, an illumination device 114, an air cleaning device 115, a fan 116, a window shade 117, the PC 112 and the like by all of which the indoor environments of the office are controlled. Other devices such as a ventilation fan and a humidifier are added to the control device 105 in some cases. It should be noted that the PC 112 which is a part of elements configuring the work status detecting unit 103 may also function as the control device 105.

FIG. 2A shows an example of a hardware configuration of the central control apparatus 200 according to the environmental control system of the embodiment. The central control apparatus of the example includes a network I/F 21, a central processing apparatus (control unit) 22, an input apparatus 23, a primary storage apparatus (memory) 24 and a secondary storage apparatus 25 which configure a storage unit, and an output apparatus 26. A display apparatus of the input apparatus 23 and a display apparatus of the output apparatus 26 may be configured as a single display apparatus having a common screen with a GUI function. The units in the central control apparatus 200 are coupled to each other through an inner bus 27, and can transmit or receive data to/from each other. The network I/F 21 is, for example, a network card such as a LAN card, and collects operation logs created by staff members in an operation center.

The central processing apparatus 22 is mainly configured using a microprocessor, and executes programs stored in the primary storage apparatus 24 and the secondary storage apparatus 25.

The instruction input apparatus 23 is, for example, a pointing device such as a keyboard and a mouse. The instruction input apparatus 23 accepts an instruction such as inputting or displaying layout plan calculation setting by an operation manager. Further, the instruction may be input from an instruction input apparatus of another terminal such as a PC which is coupled through a network.

The display apparatus of each of the input apparatus 23 and the output apparatus 26 is realized by using, for example, a display adapter and a liquid crystal panel. The primary storage apparatus 24 is realized by using, for example, a random access memory (RAM) or a read-only memory (ROM), and stores therein programs executed by the central processing apparatus 22 and data processed by the apparatus.

The secondary storage apparatus 25 includes, for example, a hard disk, a DVD, or a CD and a drive thereof, or a non-volatile memory such as a flash memory, and stores therein programs executed by the central processing apparatus 22 and data processed by the apparatus.

Figure 2B:
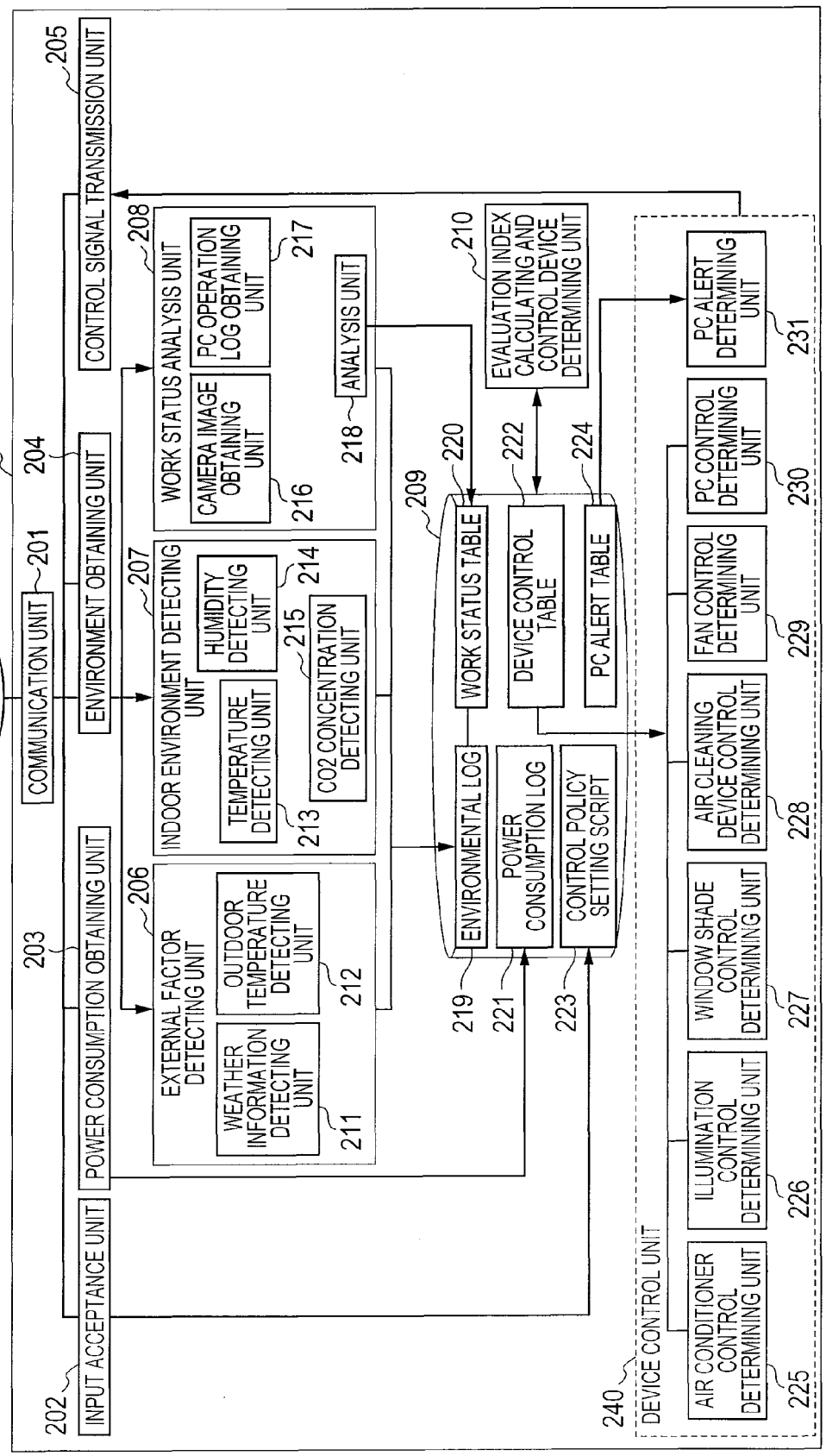
FIG. 2B is a diagram for showing an example of functional blocks of the central control apparatus in FIG. 1.

FIG. 2B is a functional block diagram for showing a part of functions provided with the central control apparatus 200 according to the embodiment. A part or all of these functional blocks may be realized by hardware in addition to that shown in FIG. 2A, but may be realized as a software program executed by the central processing apparatus 200. It should be noted that as an example in the following description, all of these functional blocks are software programs executed by the central processing apparatus 200 or data held by the secondary storage apparatus 25.

As shown in FIG. 2B, the central control apparatus 200 include, as parts of the function, a communication unit 201, an input acceptance unit 202, a power consumption obtaining unit 203, an environment obtaining unit 204, a control signal transmission unit 205, an external factor detecting unit 206, an indoor environment detecting unit 207, a work status analysis unit 208, a data holding unit 209, an evaluation index calculating and control device determining unit 210, and a device control unit 240. All of transmission and reception of data through a network are performed via the communication unit 201. The external factor detecting unit which detects external factors outside the office building includes a weather information detecting unit 211 which detects weather information from a weather information service or the like of the outside, and an outdoor temperature detecting unit 212 which detects an outdoor temperature sensed by an outdoor temperature sensor or the like. The indoor environment detecting unit 207 which detects the indoor environments of the office building includes a temperature detecting unit 213 which detects an indoor temperature sensed by an indoor temperature sensor or the like, a humidity detecting unit 214 which detects humidity sensed by a humidity sensor or the like, and a CO2 concentration detecting unit 215 which detects a CO2 concentration sensed by a CO2 sensor or the like. The work status analysis unit 208 includes a camera image obtaining unit 216 which obtains a camera image of an office worker who is a target of analysis for a work status, a PC operation log obtaining unit 217 for a PC operated by the office worker, and an analysis unit 218 which analyzes the work status of the office worker using the camera image and the PC operation logs. A data holding unit 209 corresponds to the primary storage apparatus 24 and the secondary storage apparatus 25 of FIG. 2A, and includes an environmental log 219, a work status table 220, a power consumption log 221, a device control table 222, a control policy setting script 223, and a PC alert table 224.

Information detected by the external factor detecting unit 206 and the indoor environment detecting unit 207 and information analyzed by the work status analysis unit 208 using the work status table 220 are held in the environmental log 219 of the data holding unit 209. Information of power consumption of the devices obtained by the power consumption obtaining unit 203 is held in the power consumption log 221. Control policies which are accepted by the input acceptance unit 202 and are input by a system manager or the like are held in the control policy setting script 223.

The evaluation index calculating and control device determining unit 210 calculates an evaluation index of each environmental device on the basis of environmental information of the area and information about the power consumption of each environmental device, determines a combination of controls of the environmental devices adapted to the control policies on the basis of the calculated evaluation indexes, the set control policies, and the work status of each office worker in the area, and records the results into the device control table 222 and the PC alert table 224. The device control unit 240 includes an air conditioner control determining unit 225 which determines the control of a set temperature of the air conditioner in the room on the basis of the determination by the evaluation index calculating and control device determining unit 210, an illumination control determining unit 226 which determines the control of the illumination intensity and the color temperature of the illumination device, a window shade control determining unit 227 which determines the control of opening or closing the window shade, an air cleaning device control determining unit 228 which determines the control of ON/OFF of the air cleaning device, a fan control determining unit 229 which determines the control of ON/OFF of the fan, a PC control determining unit 230 which determines the control of a CPU and the like of the PC, and a PC alert determining unit 213 which controls an alert displayed on the PC screen of each office worker.

The device control unit 240 selects the control of each device from the device control table 222 and an alert to be displayed on the PC screen of each office worker from the PC alert table 224, and instructs the control signal transmission unit 205 to transmit a control signal.

Figure 3:
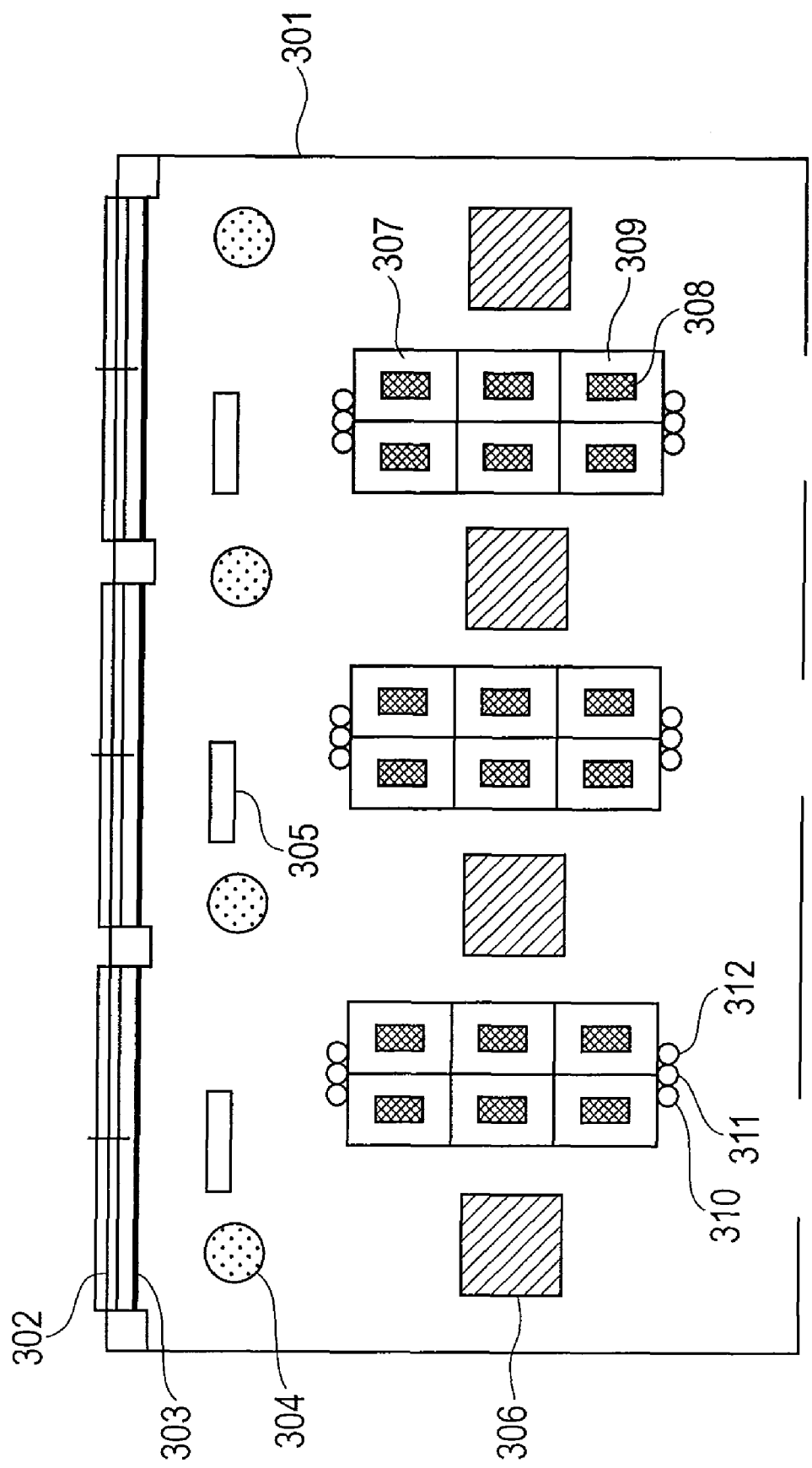
FIG. 3 is a diagram for showing an example of a room (area) of an office building controlled by the environmental control system of the embodiment.

FIG. 3 shows an example of a layout of an area, namely a room in an office building as a control target of the environmental control system 100. The system controls the devices by which energy saving and comfort are realized in a room 301. The room 301 includes windows 302, window shades 303, fans 304, air cleaning devices 305 on the ceiling, and air conditioners 306 on the ceiling. Desks 307 on which office workers work are arranged in the room, and a business PC 308 and a camera 309 coupled to the PC through a USB are installed on each desk. Further, temperature sensors 310, humidity sensors 311, and CO2 sensors 312 are installed in the room. Each sensor may be provided at a proper place on the corridor side or the window side, or may be installed at the desk 307. The respective control devices (303 to 306), sensors (310 to 312), PCs and cameras (work status detecting units) are coupled to the central control apparatus 200 through a network as shown in FIG. 1.

Figure 4:
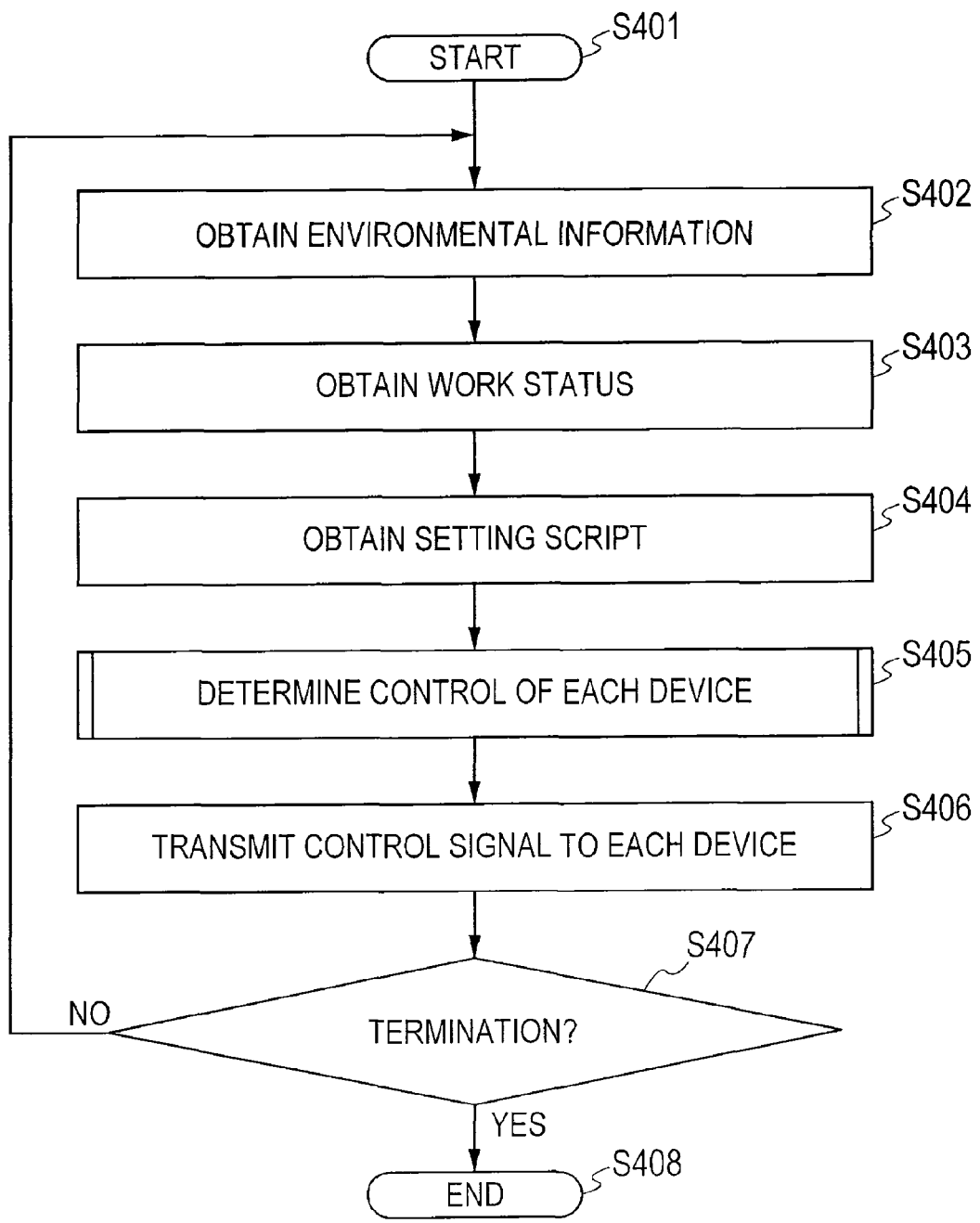
FIG. 4 is a diagram for showing an example of a processing flow of environmental device control by the central control apparatus in FIG. 1.

FIG. 4 shows a processing flow of the central control apparatus 200. When the process is started (S401), the central control apparatus 200 obtains environmental information (S402). The environmental information includes weather information and an outdoor temperature obtained by the external factor obtaining unit 101, and a temperature, humidity, and a CO2 concentration detected in the room by the indoor environment detecting unit 102. Next, a work status is obtained (S403). The work status is of an office worker obtained by the work status detecting unit 103. Next, the control policy setting script 223 containing the setting policies for the respective environmental devices such as air conditioners and illumination is obtained (S404). Next, the obtained environmental information and work status are added to the control policy setting script 223 in the evaluation index calculating and control device determining unit 210 to determine the controls of the respective devices (S405). Next, a control signal is transmitted to instruct the respective devices to control as determined (S406). If the control is not finished, the process is repeated (S407), or is terminated (S408).

The time period of repeating may be set as the fastest time at which the control unit 22 of the central control apparatus 200 can process, or may be arbitrarily set by a system manager or the like using a control policy setting script 701 (see FIG. 7). The process may be terminated by instruction using a timer (not shown) or the like, or a system manager or the like may input the instruction of termination from the instruction input apparatus 23.

FIG. 5 shows an example of the work status table (220 in FIG. 2B) for office workers which is analyzed by the analysis unit 218 and held by the data holding unit 209. The analysis unit 218 analyzes a work status on the basis of the camera image and the PC operation logs of the office worker, and classifies the work status into any one of work types shown in the work status analysis table 501. The work status is classified into a PC operation 502 or specific operations (A, B) 503 and 504 using an operation application of the PC by analyzing the PC operation logs. Further, the work status is classified into calling 505, working-on-the-desk 506, or talking 507 with other office workers by analyzing the camera image. Furthermore, the work status may be classified into sleeping 508 by analyzing the image of the sign or gesture of the office worker. Further, absence 509 can be also detected. Further, the work status may be classified into in-a-meeting 510 or meeting-a-client 511 by analyzing not only around the PC or desk assigned to each office worker in the area to be controlled, but also the work status in another meeting room or another reception room outside the area.

Formula 1 shows an example of a formula by which "energy saving level index" that is one of the evaluation indexes of device control is calculated.

$$\text{(energy saving level index)} = 10 \times \left(1 - \frac{\sum_{n=2}^{p} (\text{power consumption of device } n \text{ per unit time})}{\sum_{n=2}^{p} (\text{theoretical value of the maximum power consumption of device } n \text{ per unit time})}\right) \quad (1)$$

wherein $p$ represents the total number of environmental devices installed in a room to be controlled "Energy saving level index" has a relation to the total amount of power consumption of p pieces of environmental devices per unit time in a room to be controlled by the environmental control system, and is normalized such that 10 is the highest and 0 is the lowest. The larger the value is, the more the system is excellent in energy saving.

Formula 2 shows an example of a formula by which "comfort level index" that is one of the evaluation indexes of device control is calculated.

(i) When a discomfort index $Cm \geq 67.5$, (comfort level index)=$Cm$+(CO2 concentration weighted value)

(iii) When a discomfort index $Cm < 67.5$, (comfort level index)=$Cm$−(CO2 concentration weighted value) wherein $Cm$ represents a discomfort index (2)

The comfort level shows comfort of each office worker in an indoor environment. "Comfort level index" is calculated on the basis of a generally-used discomfort index Cm determined by a temperature and humidity, and a CO2 concentration weighted value to be described later using Formula 3. A number of people do not feel discomfort in a discomfort index Cm of 60 to 75. If the index is smaller, people feel cold. If the index is larger, people feel hot. Accordingly, while 67.5 that is the intermediate value is set as the boundary, the comfort level index is calculated by adding the CO2 concentration weighted value when the index is larger than 67.5 and by subtracting the same when the index is smaller than 67.5. People do not feel discomfort in a comfort level index of 60 to 75. If the index becomes larger or smaller, people feel discomfort.

Further, the comfort level index may be calculated by using a PMV (Predicted Mean Vote) obtained on the basis of a combination of six elements such as an air temperature, an average radiation temperature, an airflow velocity, humidity, the amount of clothes, and the amount of metabolism, instead of the discomfort index. In this case, it is obvious that a function of obtaining information of the average radiation temperature, the airflow velocity, the amount of clothes, and the amount of metabolism is provided, in addition to the function of the indoor environment'detecting unit 102 of FIG. 1.

Figure 6:
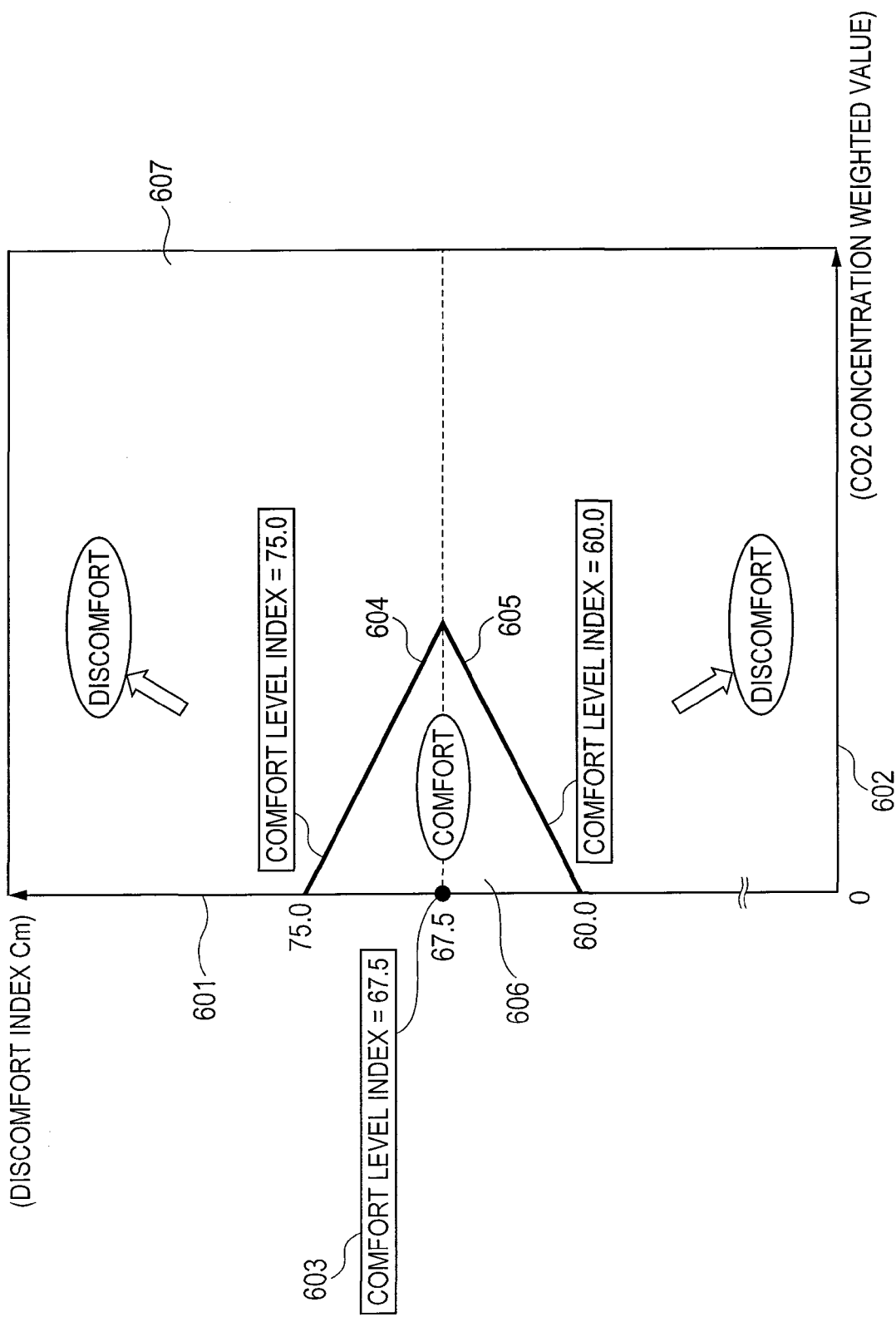
FIG. 6 is a diagram for showing an example of comfort level indexes in the embodiment.

FIG. 6 is a diagram for showing an example of a relation among "comfort level index", the discomfort index Cm and the CO2 concentration weighted value in Formula 2. The vertical axis represents a discomfort index (Cm) 601 and the horizontal axis represents a CO2 concentration weighted value 602. When the discomfort index is 67.5 where the largest number of people feel comfort and the CO2 concentration weighted value is 0, the comfort level index is 67.5 (603) where it can be determined that the environment under which people feel comfort is the best. If the comfort level index becomes larger or smaller than 67.5, people feel discomfort. The comfort level is dependent also on the CO2 concentration weighted value, as shown in Formula 2.

Thus, for example, when a boundary (604) of "a comfort level index" of 75.0 and a boundary (605) of "a comfort level index" of 60.0 are set as threshold values, a range including "a comfort level index" of 67.5 may be determined as "comfort" (606) and a range not including the same may be determined as "discomfort" (607). Alternatively, the areas of "comfort" and "discomfort" may be further divided into plural areas to determine the comfort level in multi-steps.

Formula 3 shows an example of a formula by which the CO2 concentration weighted value used for calculation of the comfort level index described in Formula 2 is calculated.

(i) When the CO2 concentration $C<1000$ ppm, (CO2 weighted value)=0

(ii) When the CO2 concentration $C \geq 1000$ ppm, (CO2 weighted value)=$C \times 0.01$ (weight coefficient)

wherein $C$ represents a CO2 concentration    (3)

The unit of the CO2 concentration C is represented by ppm, 1 ppm is 0.0001%. As stipulated in the Japanese building management law, the CO2 concentration should be 1000 ppm or less. While the reference value is set at 1000 ppm, an impact on the comfort level is not considered if the CO2 concentration is smaller than the reference value. If the CO2 concentration is larger than the reference value, the CO2 concentration C is appropriately weighted (multiplication of the weight coefficient) in accordance with the CO2 concentration C and the obtained value is added to the calculation of the comfort level as the CO2 weighted value.

Formula 4 shows an example of a formula by which "production efficiency index" that is one of the evaluation indexes of device control.

$$(\text{production efficiency index}) = \frac{(\text{the number of completed operations})}{(\text{the target number of operations}) \times (\text{work engaging period})} \quad (4)$$

If the work is routine work, the production efficiency can be calculated on the basis of the number of completed operations in a unit time for the target number of operations. The number of operations can be analyzed on the basis of the work information obtained from the work status detecting unit 103. If the production efficiency index is larger than 10 that is a reference value, the production efficiency is excellent. If the work is not routine work, the production efficiency index may be defined using an achievement rate for a target value. As an example of the routine work, there is a call handling operation to customers in a call center.

FIG. 7 shows an example of descriptions of a control policy setting script 323 for the environmental devices held by the data holding unit 209. In a control policy setting script 701 of the example, values used in the scripts are defined (702). In an evaluation index definition 703, the energy saving level index (5th line) shown in Formula 1, the comfort level index (6th line) shown in Formula 2, and the production efficiency index (7th line) shown in Formula 3 are defined. The formulae of the respective indexes may be preliminarily held by the storage apparatus 25, or may be arbitrarily set and changed in the scripts by a system manager or the like. It should be noted that although an example of setting three evaluation indexes of "energy saving level index", "comfort level index" and "production efficiency index" is shown in the evaluation index definition, it is obvious that at least one of them may be set or another evaluation index and the above-described indexes may be set in combination according to usage or situations.

In a variable definition 704, actual measurement values (11th to 15th lines) obtained by the external factor obtaining unit 101 and the indoor environment detecting unit 102 of the sensor or the like, actual measurement values (17th to 19th lines) of the respective indexes calculated on the basis of the actual measurement values, an analyzed work type (21st line), a time (23rd line), and an area control method (24th line) are defined. In a control value definition 705, target values of controls of the indoor environment such as a temperature and humidity are defined (28th to 31st lines).

Next, a control policy 706 of each environmental device is described. In the first place, an evaluation index condition 707 is, described. The priorities (37th to 39th lines) of "energy saving level index" shown in Formula 1, "comfort level index" shown in Formula 2, and "production efficiency index" shown in Formula 3, and allowable control ranges (41st to 43rd lines) of these indexes are described.

Next, a work adaptive condition 708 is described. Here, it is assumed that control conditions adapted to the work of each office worker is described. In this case, the work adaptive condition means a control condition of a device which provides the most comfortable environment under which each office worker can efficiently carry out the current work. In the case where the work status of the office worker detected by the work detecting unit 103 indicates usage of a CAD application, a control condition to maximize the speed of the CPU used for the work is shown in the 47th to 48th lines. When carrying out work requiring a number of calculations (data processes) such as CAD and image processing in a PC operation, it is desirable that the PC be used while maximizing the speed of the CPU. However, when carrying out work requiring less calculation such as text processing, it is not necessary to maximize the speed of the CPU. Accordingly, the CPU used for the work is set at a low speed, and thus the control in consideration of energy saving can be realized. Further, in the case where plural applications are being executed in parallel, it is necessary to increase the speed of the CPU according to situations. As described above, in accordance with the types or the number of applications being used, the work adaptive condition 708 is described to change the speed of the CPU even in the same PC operation. If the work status of the office worker detected by the work detecting unit 103 indicates "sleeping", a control condition to encourage the office worker to refresh by lowering the temperature is shown in the 50th to 51st lines. If office workers are absent, a control condition to switch all the devices into the energy saving mode or to stop the operation of the devices is shown in the 53rd to 54th lines so as to maximize the energy saving level. A control condition to permit a temperature rise in a room if the temperature rise is lower than a certain level in a time period from 11:45 to 12:45 at lunch break is shown in the 56th to 57th lines.

Next, an area adaptive condition 709 is described. In the work adaptive condition 708, the control conditions adapted to the work of the individual office worker are described. However, an environmental device such as an air conditioner is not generally installed for each office worker in the room of the office. Thus, it is necessary to control in accordance with the intra-area. Accordingly, a control condition to obtain an average value of controls adapted to the office workers existing in a certain area can be described in the 61st line. Alternatively, a control condition to weight an important office worker may be described.

Figure 8:
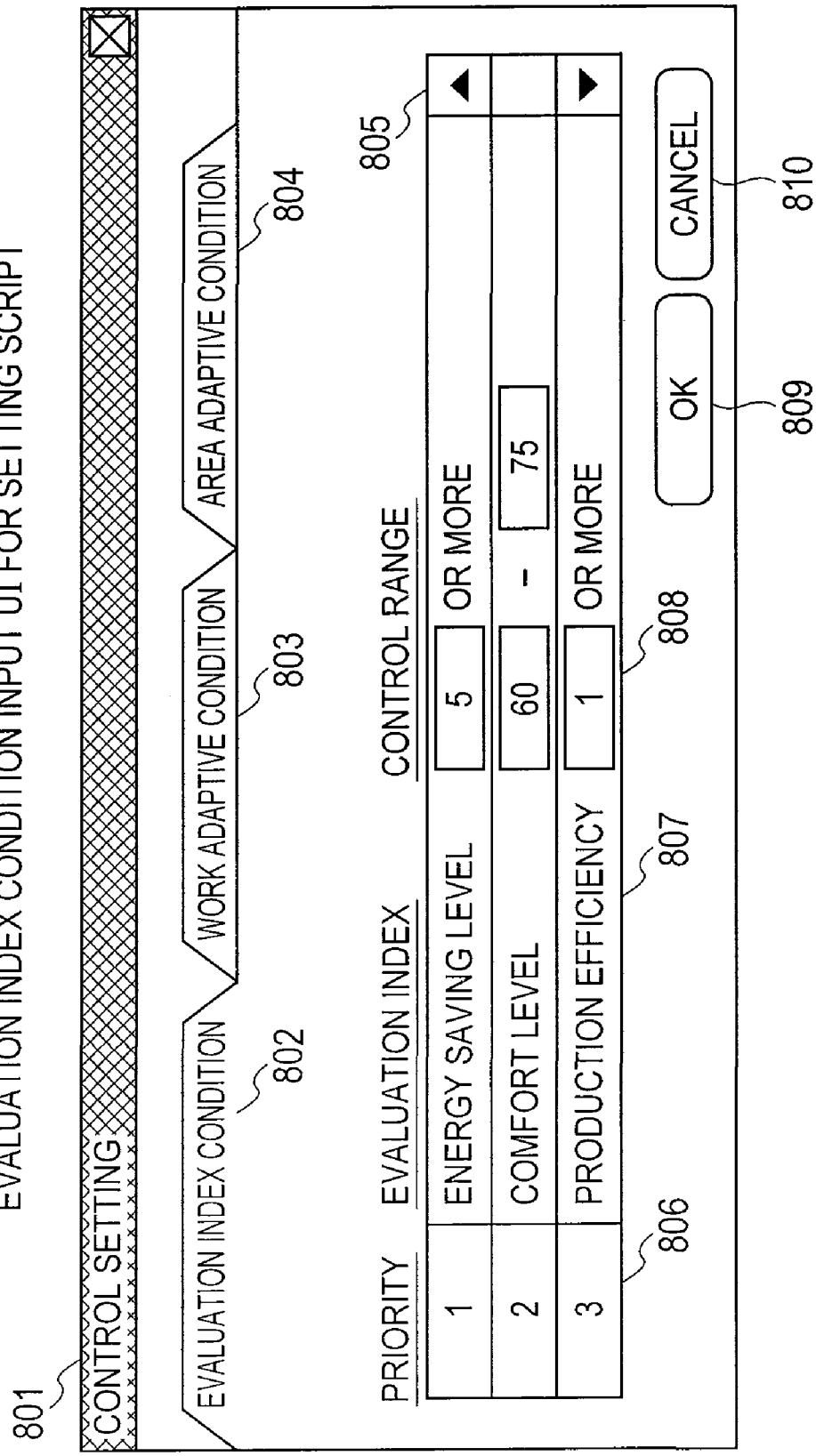
FIG. 8 is a diagram for showing an example of an input user interface for the control policy setting scripts in the embodiment.

Further, variations in environments possibly occur in such a case where the actual measurement temperatures differ on the corridor side and the window side even if the indoor control temperature is set constant. Accordingly, if variations in the maximum and minimum values of the comfort level are large in different areas in a room, a control condition to recalculate the control values may be described in the 63rd to 64th lines. Further, although each area of a room is controlled in the embodiment, for example, each room on a floor may be controlled in accordance with the evaluation indexes of the entire floor FIG. 8 is an example of a diagram for showing an "evaluation index condition" input user interface for the control policy setting scripts. The control policy setting scripts shown in FIG. 7 may be manually set by a system manager or the like. However, the system manager or the like needs to be used to inputting. Accordingly, in order to easily describe the scripts, the system manager or the like may input the scripts from an input interface 801 for the control policy setting scripts included in the input acceptance unit 202. For example, a system manager or the like sequentially pulls down menus of an evaluation index condition tab 802, a work adaptive condition tab 803, and an area adaptive condition tab 804 on the input interface 801, and inputs the respective conditions. If the evaluation index condition tab 802 is selected, priorities 806 can be given to the evaluation indexes 807 by clicking priority selecting buttons 805. Further, control ranges 808 of the respective evaluation indexes are input using numerical values. The input is terminated by clicking an OK button 809 or a cancel button 810. Even a worker who is unable to directly describe the scripts can easily input the evaluation index condition using the evaluation index condition input user interface.

Figure 9:
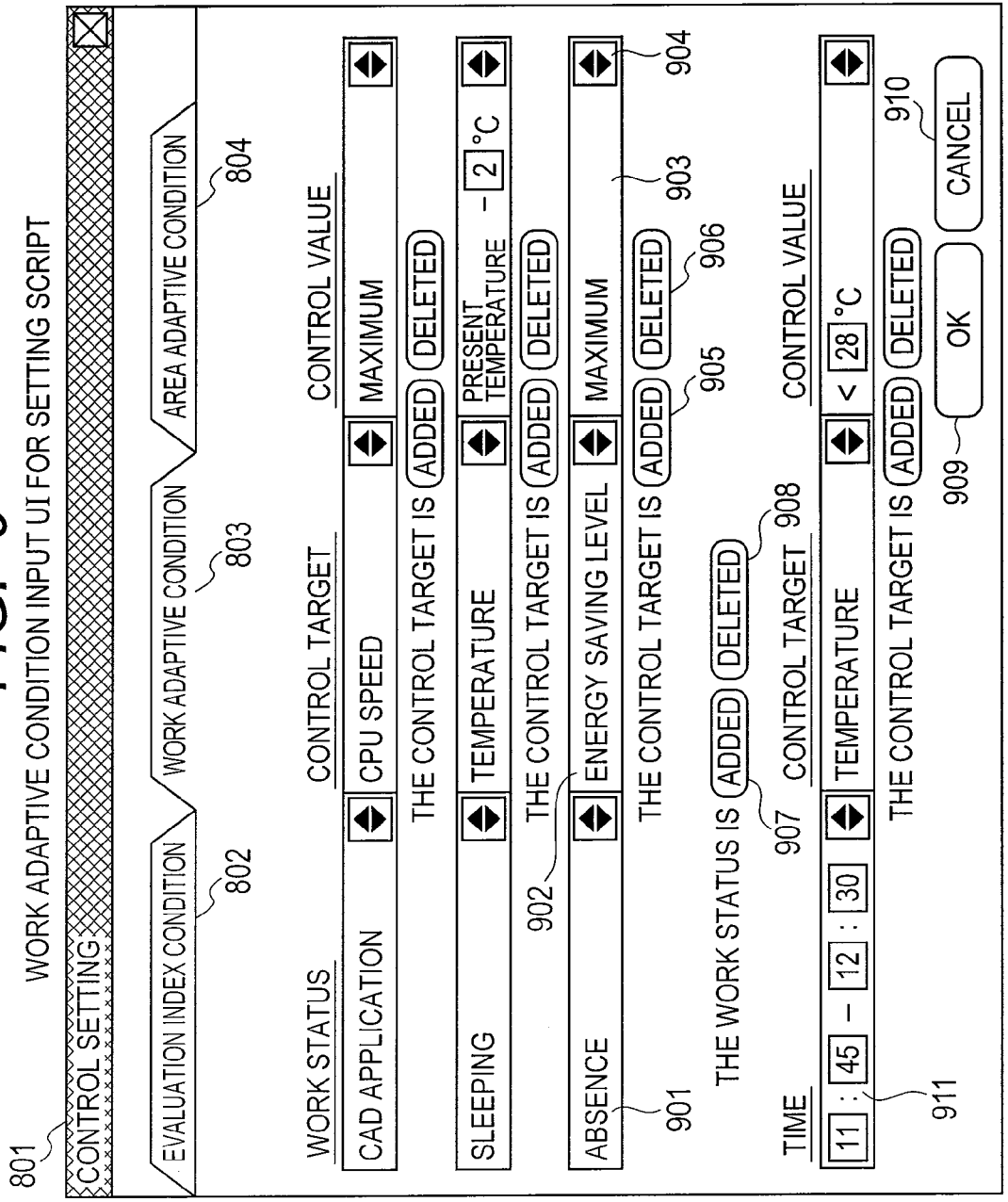
FIG. 9 is a diagram for showing an example of a work adaptive condition input user interface for the control policy setting scripts in the embodiment.

FIG. 9 is an example of a diagram for showing a "work adaptive condition" input user interface for the control policy setting scripts. If the work adaptive condition tab 803 of the input interface 801 for the control policy setting scripts shown in FIG. 8 is selected, conditions of control targets 902 and control values 903 can be set in accordance with work statuses 901. Each condition can be changed with condition selecting buttons 904. The control target can be added or deleted with an adding button 905 or a deleting button 906. Further, the work status can be also added or deleted with an adding button 907 or a deleting button 908. The reference numeral 911 denotes a time button. The input is terminated with an OK button 909 or a cancel button 910. Even a worker who is unable to directly describe the scripts can easily input the work adaptive condition using the work adaptive condition input user interface.

Figure 10:
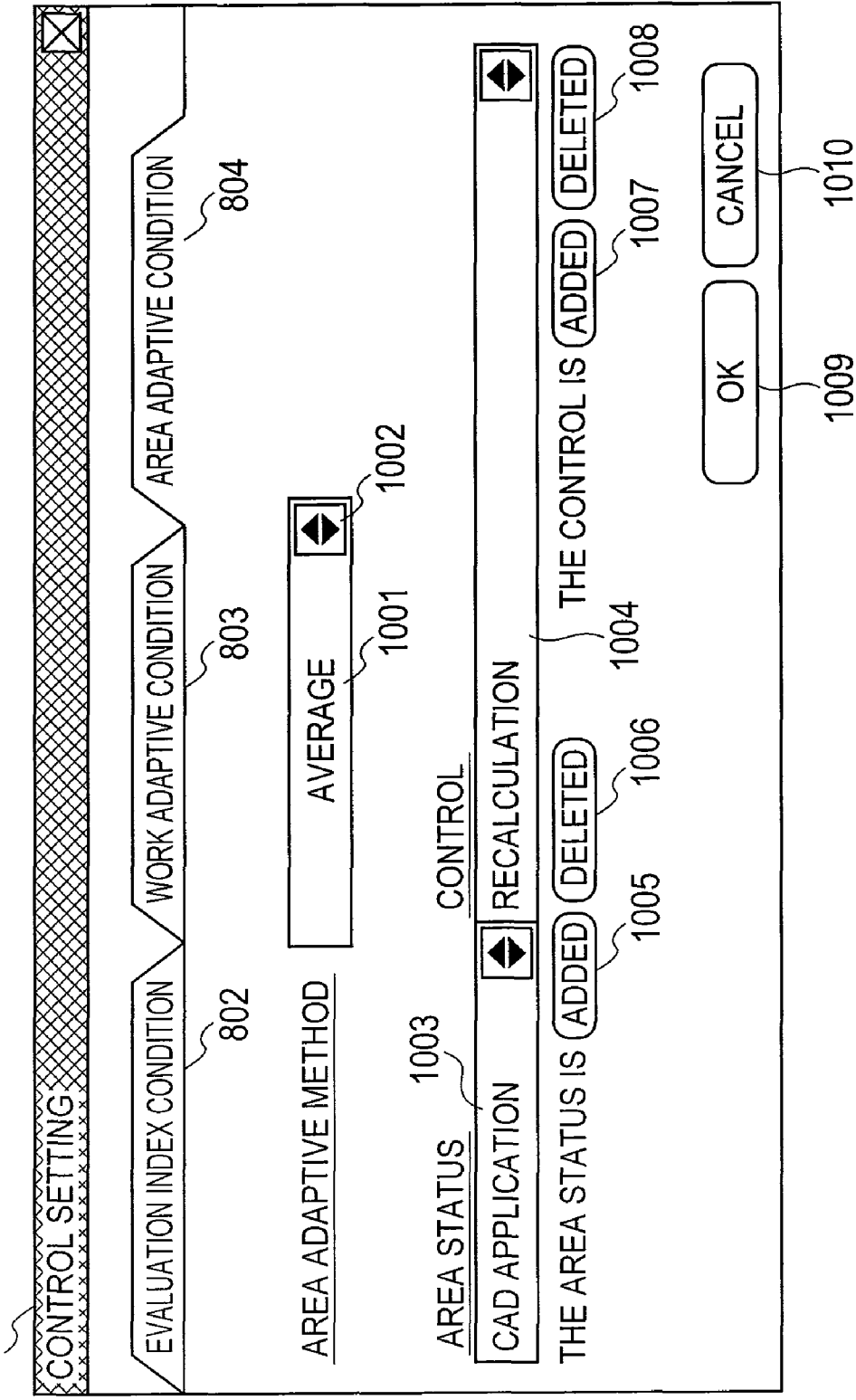
FIG. 10 is a diagram for showing an example of an area adaptive condition input user interface for the control policy setting scripts in the embodiment.

FIG. 10 is an example of a diagram for showing an "area adaptive condition" input user interface for the control policy setting scripts. If the area adaptive condition tab 804 of the input interface 801 for the control policy setting scripts shown in FIG. 8 is selected, an area adaptive method 1001 can be selected with a selection button 1002. Further, a control target 1004 can be set in accordance with an area status 1003. The area status can be added or deleted with an adding button 1005 or a deleting button 1006. The control can be added or deleted with an adding button 1007 or a deleting button 1008. The input is terminated with an OK button 1009 or a cancel button 1010. Even a worker who is unable to directly describe the scripts can easily input the area adaptive condition using the area adaptive condition input user interface.

Figure 11:
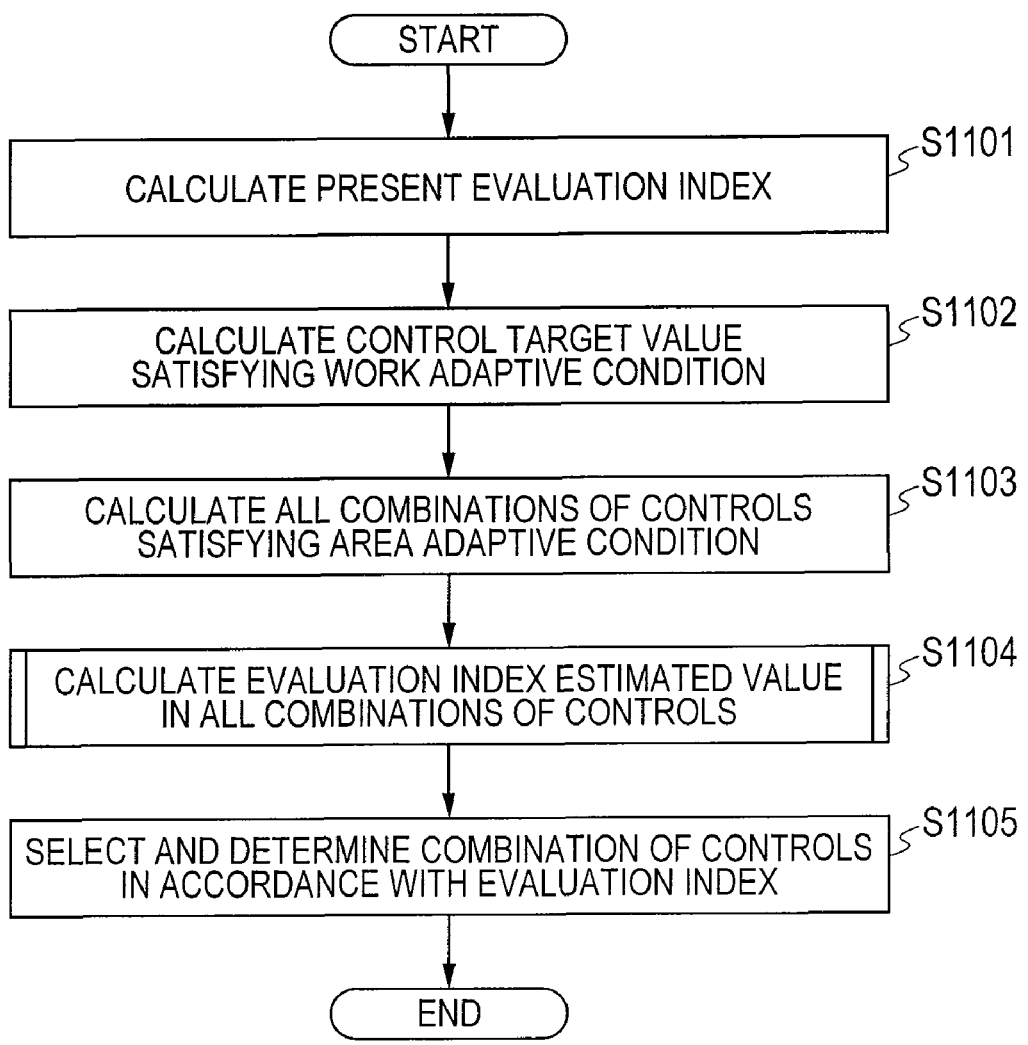
FIG. 11 is a diagram for showing an example of a processing flow in which the control of a device is determined in the processing flow of FIG. 4.

FIG. 11 is a processing flow for determining the controls of the respective control devices (113 to 116) which control the environment, and this flow corresponds to S405 of the processing flow performed by the central control apparatus 200 shown in FIG. 4. In the first place, the evaluation index calculating and control device determining unit 210 calculates the current evaluation indexes of the room on the basis of the information obtained by the environment obtaining unit 204 (S1101). The evaluation indexes include three indexes of the energy saving level (Formula 1), the comfort level of each office worker (Formula 2), and the production efficiency (Formula 3) showing the production efficiency of the work. Next, control target values which satisfy the work adaptive condition of each office worker are calculated (S1102). Here, all combinations of controls of the respective environmental control devices which satisfy the work adaptive condition described in the control policy setting script 701 shown in FIG. 7 are calculated. Next, all combinations of controls which satisfy the area adaptive condition are calculated (S1103). Next, the evaluation index calculating and control device determining unit 210 calculates estimated values of the respective evaluation indexes for the all combinations of controls (S1104) calculated in S1103, and finally selects and determines one combination of controls in accordance with the evaluation indexes among the all controls (S1105).

Figure 12:
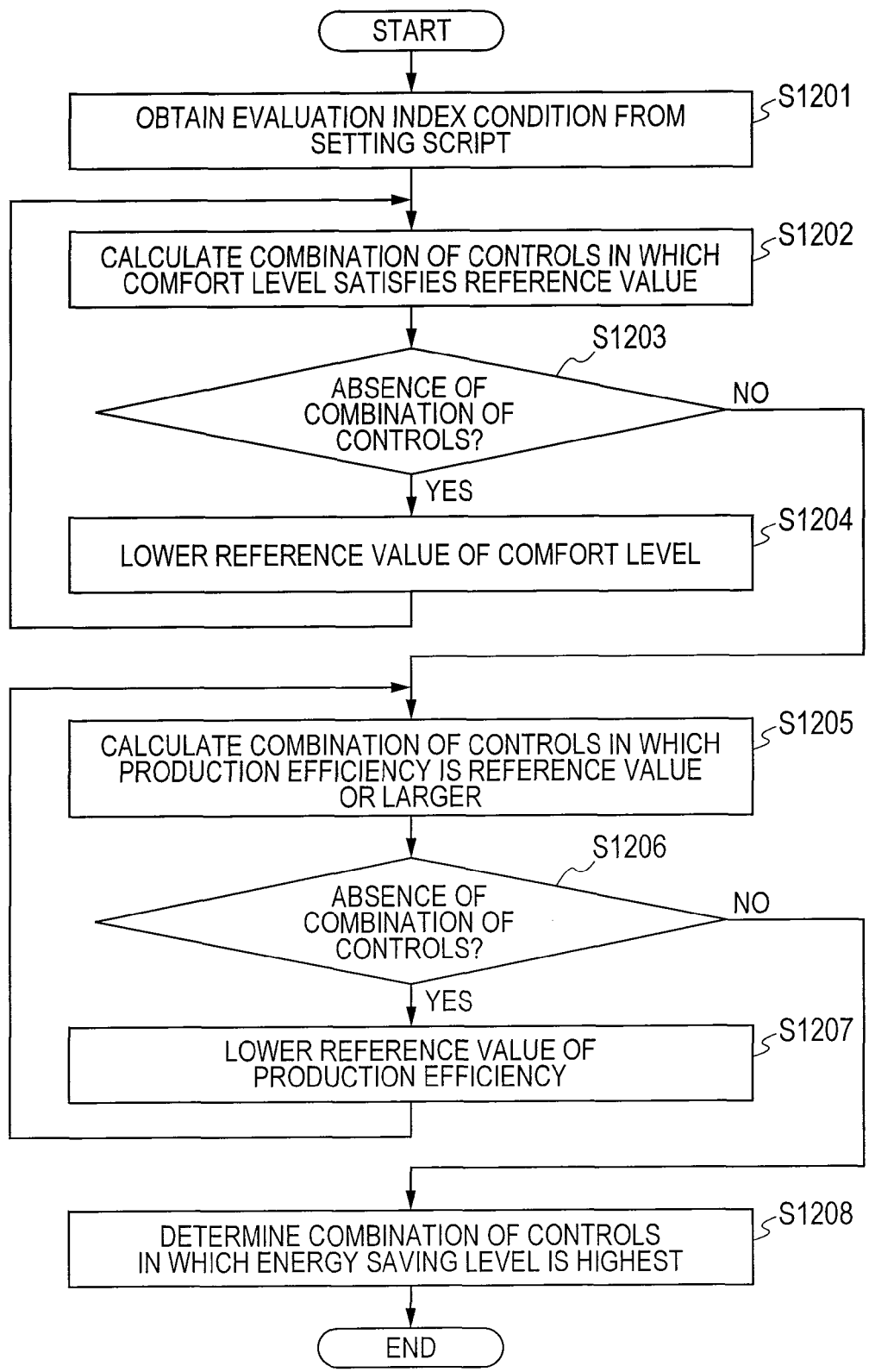
FIG. 12 is a diagram for showing an example of a processing flow in which a combination of controls in accordance with evaluation indexes is determined in the processing flow of FIG. 11.

FIG. 12 is an example of a processing flow for selecting and determining a combination of controls in accordance with the evaluation indexes, and this flow corresponds to S1105 of FIG. 11 for selecting and determining a combination of controls in accordance with the evaluation indexes. In the first place, the evaluation index condition 706 is obtained from the setting script 701 (S1201). Here, a processing flow in accordance with the evaluation index condition exemplified in FIG. 11 is shown. A combination of controls in which the comfort level is the reference value or larger is calculated among the all calculated combinations of controls (S1202). If a combination of controls in which the comfort level is the reference value or larger is not present (S1203), the reference value is lowered (S1204), and the combinations are recalculated. As similar to the above, a combination of controls in which the work efficiency is the reference value or larger is calculated (S1205) among the all combinations of controls calculated in S1202. If a combination of controls in which the work efficiency is the reference value or larger is not present (S1206), the reference value is lowered (S1207), and the combinations are recalculated. Finally, a combination of controls in which the total power consumption is the lowest is determined (S1208) among the all combinations of controls calculated in S1205. It should be noted that the flow of FIG. 12 shows a case in which the priorities set in the control policy setting scripts are in the order of "energy saving level", "comfort level", and "production efficiency" as shown in FIG. 8. If the priorities are different from the above, it is obvious that the order of determining whether or not the respective indexes are satisfied and the target of changing the reference value are accordingly changed.

FIG. 13 is an example of the control table (222 in FIG. 2B) for each environmental device. A control table 1301 for the environmental devices is held by the data holding unit 209, and contains control statuses (On, Off, and the like) of the respective environmental devices installed in the room of the office to be controlled. The environmental devices to be controlled include, for example, an air conditioner 1302, illumination 1303, a window shade 1304, a PC/monitor 1305, an air cleaning device 1306, and a fan 1307. It should be noted that the configuration of the control table is not limited to the above-described example. For example, dehumidification may be provided in the control statuses of the air conditioner 1302 and an intermediate level may be added to the control statuses On and Off of the illumination 1303. The central control apparatus 200 calculates and determines a combination of controls of the respective environmental devices using the control table (FIG. 4, S405). It should be noted that the central control apparatus 200 may include, in a combination of controls, an element which has an impact on the environment other than the devices which are automatically controlled by the central control apparatus 200, such as an element instructing that an office worker manually opens the window to lower the temperature of the room.

FIG. 14 is an example of the table (the alert table 224 in FIG. 2B) of items displayed on a client PC. A display item table 1401 for the client PC is held by the data holding unit 209. In the case where the central control apparatus 200 includes, in a combination of controls, an element which has an impact on the environment other than the devices which are automatically controlled by the central control apparatus 200, such as an element instructing that an office worker manually opens the window to lower the temperature of the room, a PC alert determining unit 231 selects an alert from an alert display table 1402 to present to a user. Further, an alert for encouraging an action such as "let's take a break" or "let's go home" may be displayed on the basis of the result of the work analysis analyzed by the work status analysis unit 208. Further, setting of a comfortable indoor temperature differs depending on a preference of each office worker. Accordingly, a menu for inputting a preference such as "raising/lowering the temperature" may be held by an input screen presentation table 1403. In this case, an office worker may input using the input instruction apparatus of the client PC 102 coupled to the central control apparatus through a network.

Figure 15:
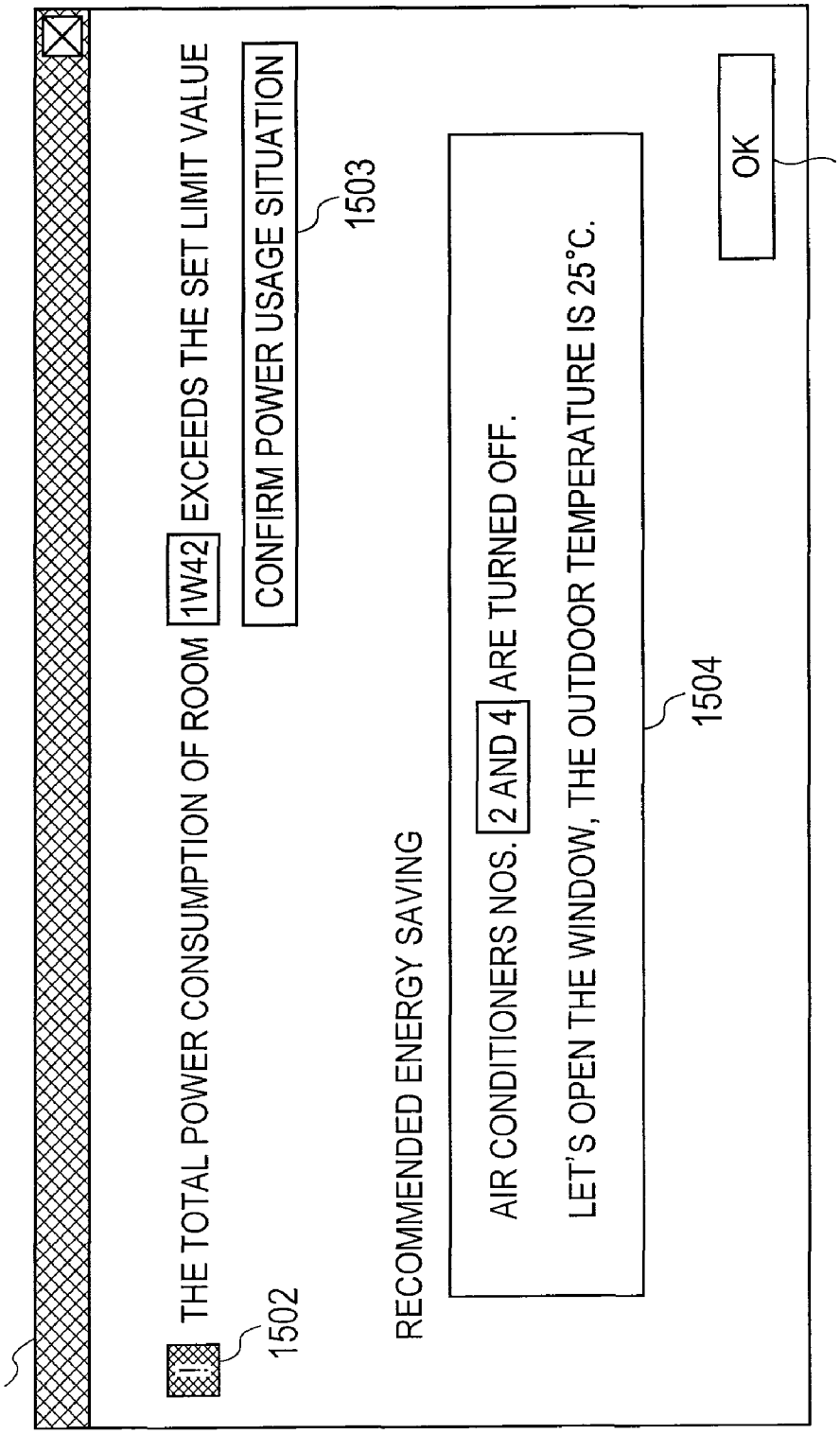
FIG. 15 is a diagram for showing an example of an alert display user interface displayed on the client PC.

FIG. 15 is an example of a diagram for showing an alert display user interface displayed on a client PC. The alert determined by the PC alert determining unit 231 in FIG. 14 is transmitted to the client PC 102 by the control signal transmission unit 205 through a network, and is displayed on the client PC 102 by an alert display user interface 1501. A single or plural alerts selected from the PC alert table 1401 is displayed on the client PC 102. For example, the control such as turning off the power of a specific air conditioner determined by the device control determining unit 203 and an alert instructing that an office worker manually opens the window are presented on a "recommended energy saving" screen 1504. At this time, an actual measurement value for triggering the presentation of the alert may be displayed (1502). Further, the operation of the environmental control system 100 may be monitored with the screen. For example, if a button 1503 of "confirm the power usage situation" is clicked, the power usage situation may be confirmed by presenting the transition of the power usage situation of the day. If the office worker confirms the alert, the screen may be closed by clicking an OK button 1505.

Figure 16:
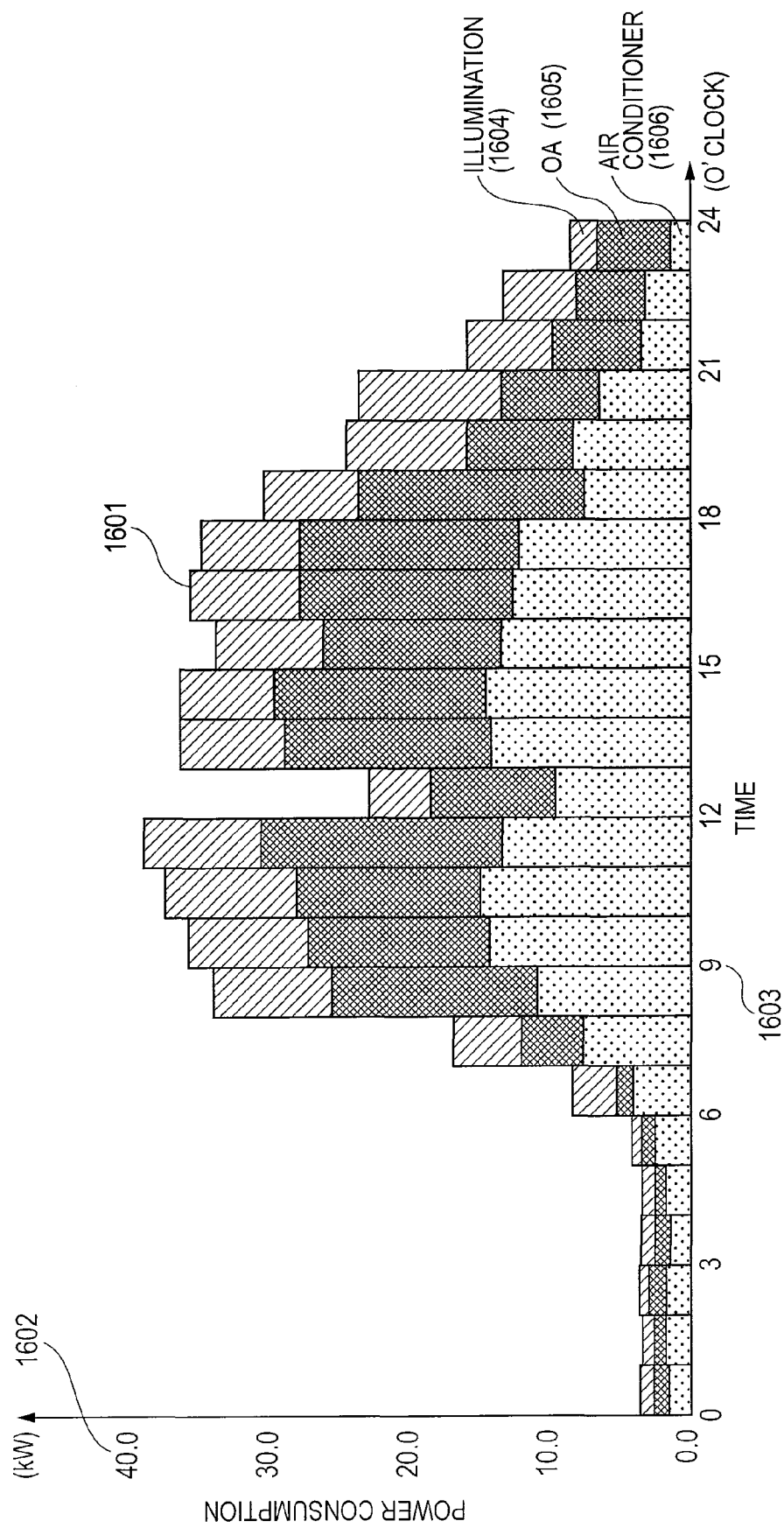
FIG. 16 is a diagram for showing an example of transition of a power usage situation for each device in the embodiment.

FIG. 16 is an example of a diagram for showing transition of the power usage situation for each device on a certain day in the office where the environmental control system 100 is employed. If the button 1503 of "confirm the power usage situation" shown in FIG. 15 is clicked, a graph 1601 for showing transition of the power usage situation for each device of the day is displayed. While the vertical axis represents power consumption 1602 and the horizontal axis represents a time 1603, the total power consumption is hourly presented using a bar chart. The power consumption for each device, for example, illumination 1604, an OA device 1605 such as a PC, and an air conditioner 1606 may be shown by color. When a manager or each office worker is willing to obtain information of the transition of the power usage situation, the presentation of the visualized power usage situation on the power usage situation transition screen enables the manager or each office worker to easily understand the status. For example, an energy saving status by an air conditioner or illumination at lunch break is visualized, so that a manager can easily win the understanding and cooperation of those involved.

Figure 17:
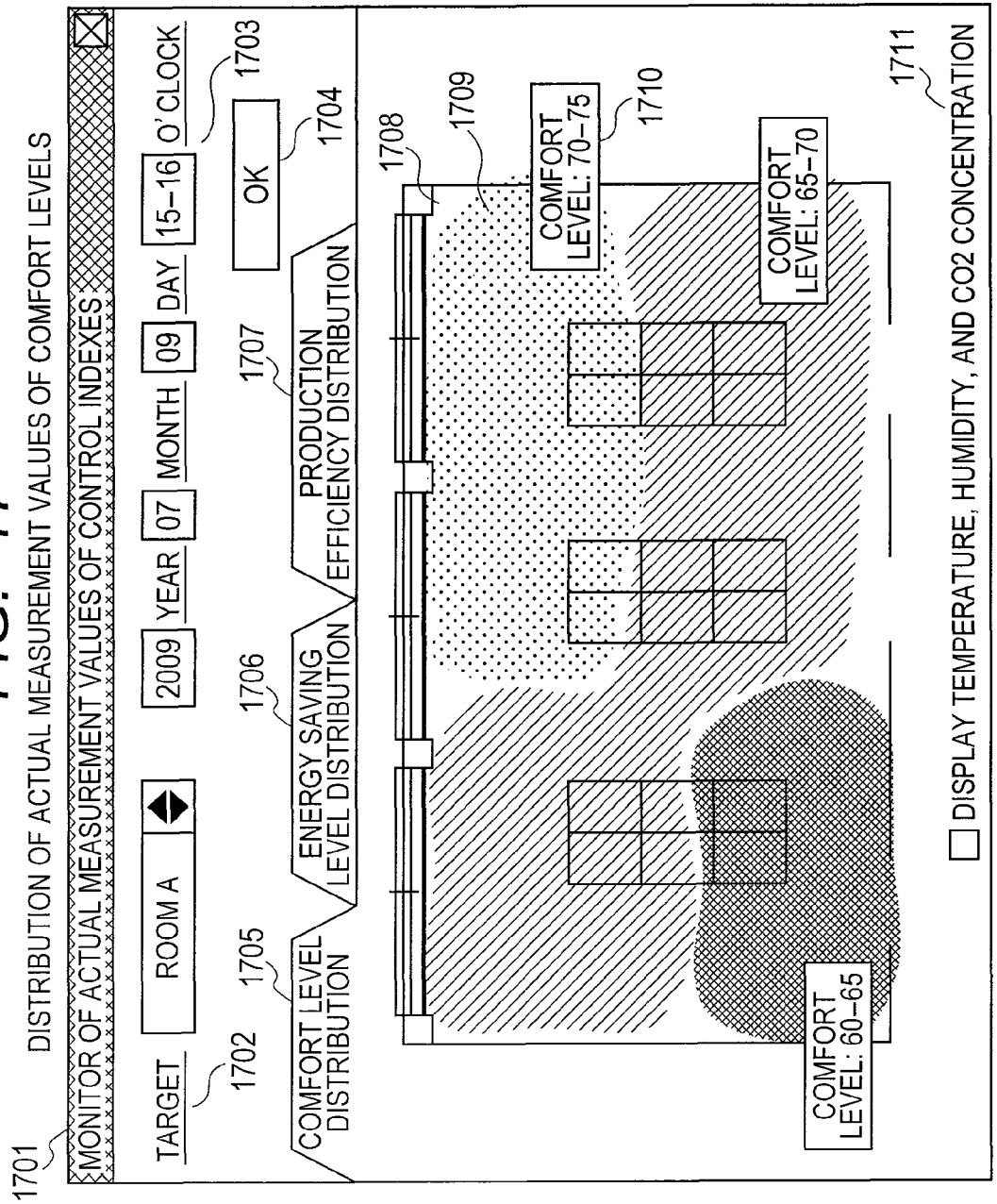
FIG. 17 is a diagram for showing an example of distribution of actual measurement values of comfort levels in the embodiment.

FIG. 17 is an example of a diagram for showing distribution of actual measurement values of "comfort level" in the office where the environmental control system 100 is employed. As an operation of the environmental control system which can monitor using the alert display user interface displayed on the client PC shown in FIG. 15, distribution 1701 of the actual measurement values of the evaluation indexes may be presented. The distribution 1701 of the actual measurement values of the evaluation indexes presents a target room 1702 for monitoring and a date and time 1703 on a measurement day and an OK button 1704. Further, a comfort level distribution tab 1705, an energy saving level distribution tab 1706, and a production efficiency distribution tab 1707 are provided, and display is switched by clicking the tabs. For example, if the comfort level distribution tab 1705 is selected, the distribution of the comfort levels in areas of the room is displayed by color (1709) while being superimposed on a layout 1708 of the target room for monitoring, and actual measurement values 1710 of the respective comfort levels are shown. Further, the temperature, humidity, and $CO_2$ concentration obtained by the sensors arranged in the room may be displayed by selection of a check box 1711. When a manager or each office worker is willing to obtain distribution information of the actual measurement values of the comfort levels, the presentation of the visualized distribution of the actual measurement values of the comfort levels on the screen displaying the distribution of the actual measurement values of the comfort levels enables the manager or each office worker to easily understand the distribution information.

Figure 18:
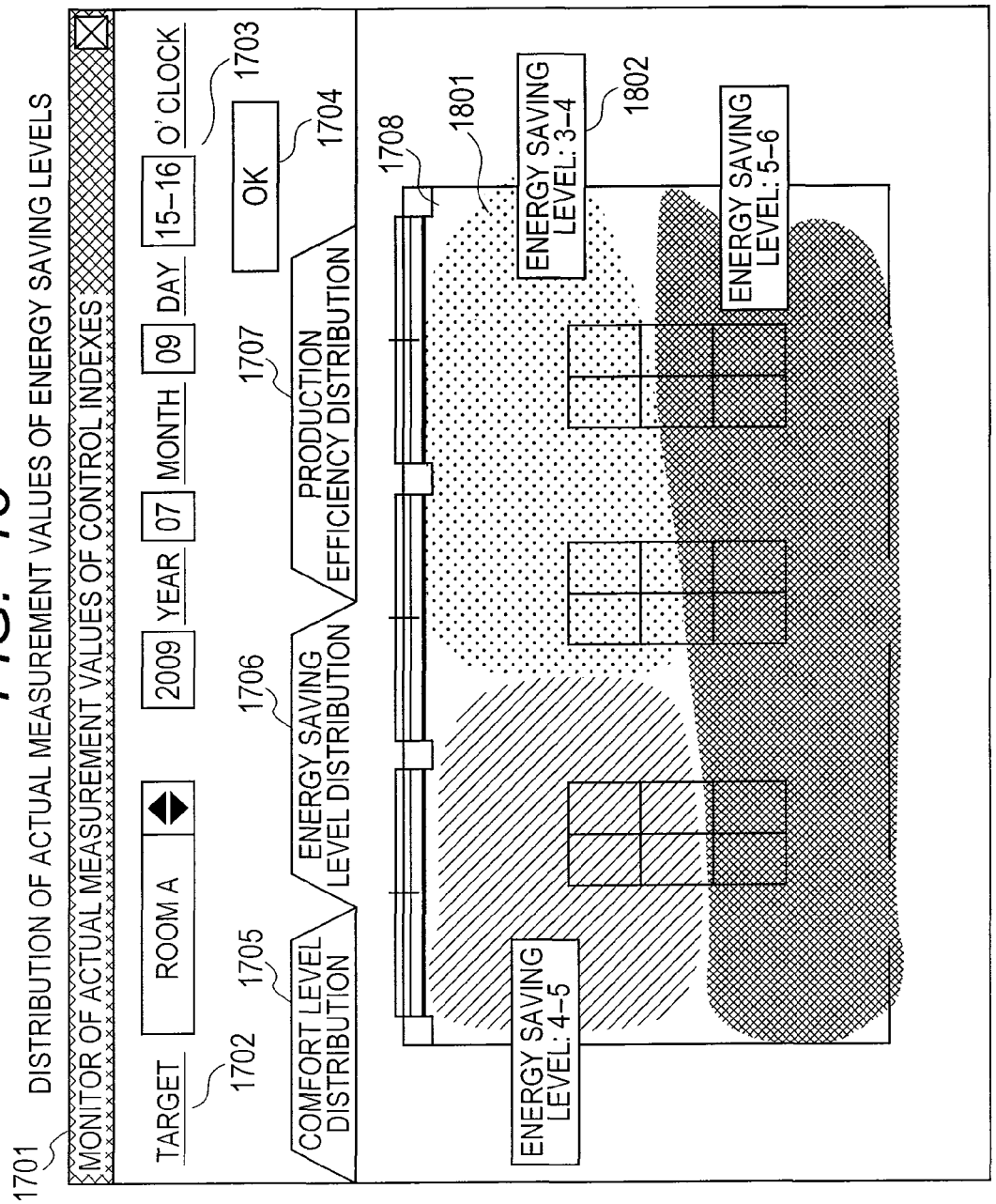
FIG. 18 is a diagram for showing an example of distribution of actual measurement values of energy saving levels in the embodiment.

FIG. 18 is an example of a diagram for showing distribution of the actual measurement values of "energy saving level" in the office where the environmental control system 100 is employed. If the energy saving level distribution tab 1706 is selected in the distribution 1701 of the actual measurement values of the evaluation indexes, the distribution of the energy saving levels in areas of the room is displayed by color (1801) while being superimposed on the layout 1708 of the target room for monitoring, and energy saving levels 1802 of the respective distribution areas are shown. As the value becomes larger, the energy saving level becomes higher. Alternatively, the power consumption per unit time may be shown. When a manager or each office worker is willing to obtain distribution information of the actual measurement values of the energy saving levels, the presentation of the visualized distribution of the actual measurement values of the energy saving levels on the screen displaying the distribution of the actual measurement values of the energy saving levels enables the manager or each office worker to easily understand the distribution information and to win the understanding and cooperation of those involved. For example, the manager determines whether or not the energy saving levels displayed on the screen are within a target range, revises the control policies for the devices in the control policy setting scripts if needed, and resets the evaluation index condition, so that desired energy saving levels can be obtained while winning the understanding of each office worker.

Figure 19:
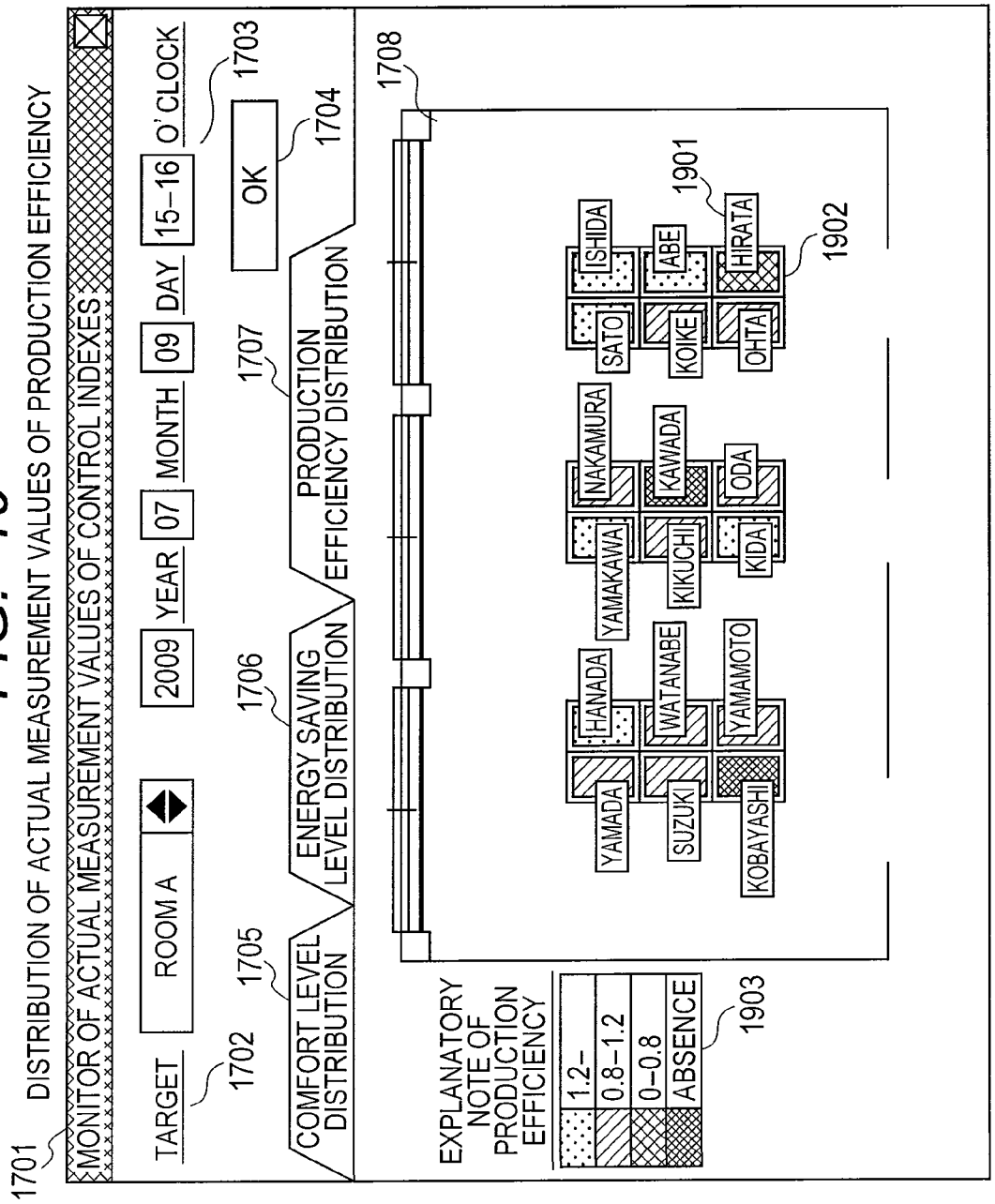
FIG. 19 is a diagram for showing an example of distribution of actual measurement values of production efficiency in the embodiment.

FIG. 19 is an example of a diagram for showing distribution of the actual measurement values of "production efficiency" in the office where the environmental control system 100 is employed. If the production efficiency tab 1707 is selected in the distribution 1701 of the actual measurement values of the evaluation indexes, IDs or names 1901 for identifying the office workers and icons 1902 for showing the production efficiency are presented while being superimposed on the layout 1708 of the target room for monitoring. The icons for showing the production efficiency are displayed by color on the basis of values of the production efficiency as shown in an explanatory note 1903 of production efficiency. When a manager or each office worker is willing to obtain distribution information of the actual measurement values of the production efficiency, the presentation of the visualized distribution of the actual measurement values of the production efficiency on the screen displaying the distribution of the actual measurement values of the production efficiency enables the manager or each office worker to easily understand the distribution information. For example, the manager determines whether or not the production efficiency displayed on the screen is within a target range, revises the control policies for the devices in the control policy setting scripts if needed, and resets the evaluation index condition, so that desired production efficiency can be obtained while winning the understanding of each office worker.

Figure 20:
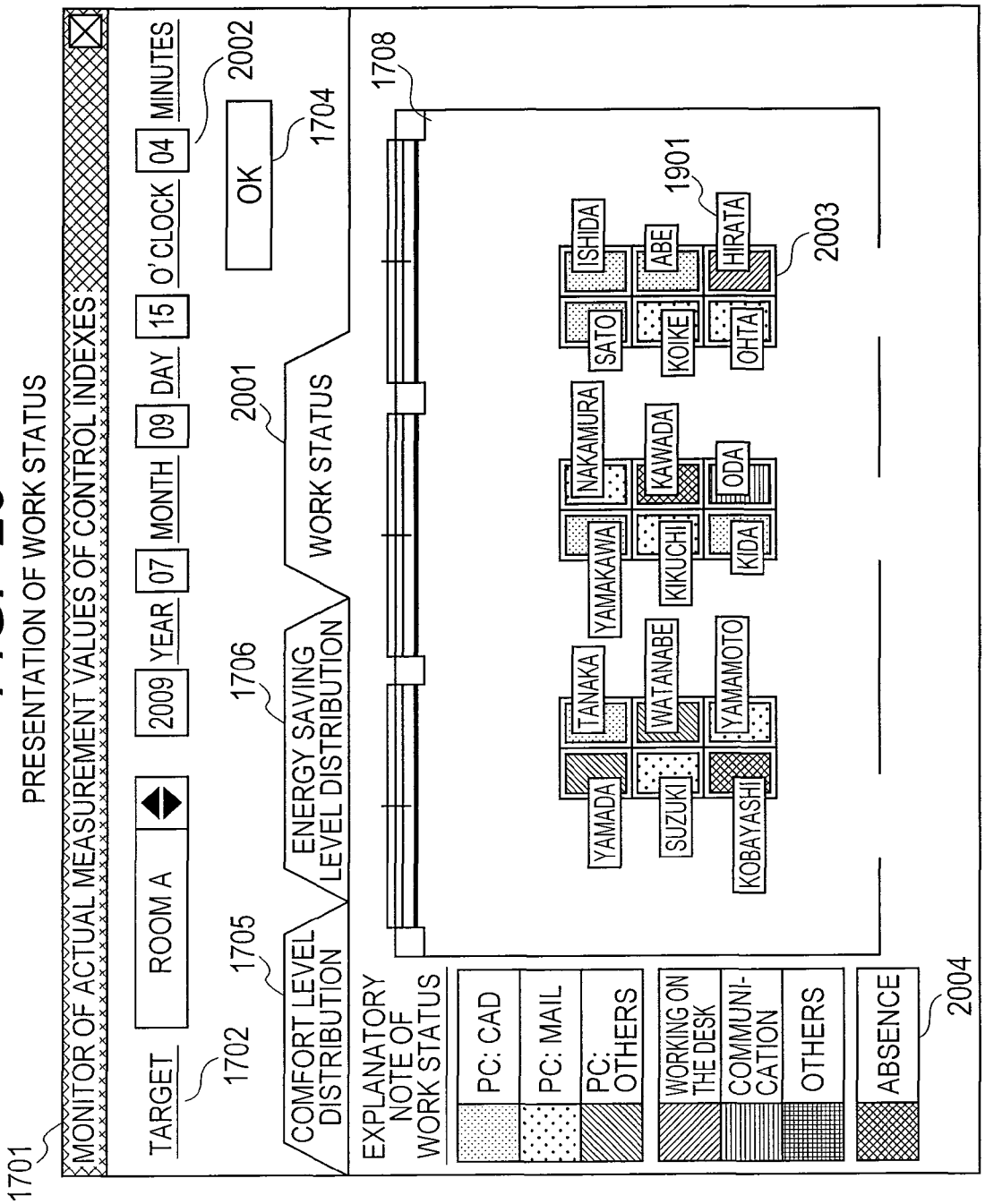
FIG. 20 is a diagram for showing an example of presentation of work statuses in the embodiment.

FIG. 20 is an example of a diagram for presenting "work status" in the office where the environmental control system 100 is employed. A work status tab 2001 presenting work statuses may be presented in the distribution 1701 of the actual measurement values of the evaluation indexes. If the work status tab 2001 is selected, the IDs or names 1901 for identifying the office workers and work statuses 2003 of the office workers obtained by the analysis unit 218 are presented while being superimposed on the layout 1708 of the target room for monitoring. The time is not necessarily a unit time, but may be a certain time length 2002. The work statuses may be displayed by color on the basis of work types as shown in an explanatory note 2004 of work statuses, or may be displayed using picture icons for showing work types. When a manager or each office worker is willing to obtain information of the work statuses of the respective office workers, the presentation of the visualized work statuses of the respective office workers on the screen displaying the work statuses enables the manager or each office worker to easily understand the work statuses. For example, it is conceivable that the manager recognizes changes in the work status of each office worker after setting the precious scripts, and watches an office worker who is high in "comfort level", but poor in "production efficiency" while changing the condition of the air conditioner using the scripts.

According to the embodiment, the following effects can be obtained.

(1) The presence or absence and the work status of each office worker in an area are monitored and the environmental control devices are finely controlled in accordance with the work status of each office worker, so that it is possible to improve the entire comfort in the area.

(2) While indexes for evaluating energy saving effects, comfort, and production efficiency are defined as control factors of the environmental control devices in an area, the priorities and allowable ranges of the respective evaluation indexes can be arbitrarily set, and transition of these indexes and distribution in the area are presented on a screen, so that a manager or each office worker can deepen the understanding of the environmental control in the area, and a feedback based on the presentation can be easily given.

(3) Even if relevant people such as building managers have no detailed knowledge about the environmental control system, the control policies on the basis of the respective indexes for evaluating energy saving effects, comfort, and production efficiency can be easily set using the scripts on the display screen.

It is obvious that the present invention is not limited to the above-described embodiment, but can be widely applied to a field where environmental control devices which can control indoor environments in view of energy saving levels, comfort, and production efficiency are provided.

For example, there has been described a case in which environmental control is performed for one area in the embodiment. However, the embodiment can be applied to environmental control across plural areas. In this case, optimum conditions for the priorities of "energy saving level index", "comfort level index", and "production efficiency index" and the allowable control ranges thereof may be individually set for each area, or optimum conditions may be set in units of plural areas. It is conceivable in the latter case that, for example, while the highest priority is given to "production efficiency index" in one area and the highest priority is given to "energy saving level" in another area on the basis of the work statuses, the areas are controlled in the allowable control ranges, and the whole office building is managed so that "energy saving level index", "comfort level index", and "production efficiency index" fall within the predetermined ranges.

What is claimed is:
1. An intra-area environmental control system which includes a plurality of environmental devices that control environments in an area, and a control apparatus that monitors conditions in the area to control the respective environmental devices in accordance with the conditions in the area, the control apparatus comprising:
   a unit for setting control policies for the respective environmental devices in accordance with a work status in the area on the basis of predetermined evaluation indexes;
   a unit for obtaining information about power consumption of the respective environmental devices;
   a unit for detecting environmental information of the area;
   a unit for detecting the work status of each person in the area; and
   an evaluation index calculating and control device determining unit,
   wherein the evaluation indexes of the respective environmental devices are calculated on the basis of the environmental information of the area and the information about the power consumption of the respective environmental devices, a combination of controls of the respective environmental devices adapted to the control policies is determined on the basis of the calculated evaluation indexes, the set control policies, and the work status of each person in the area, and the respective environmental devices are controlled on the basis of the determined combination.

2. The intra-area environmental control system according to claim 1,
wherein the unit for detecting the work status includes a PC of each person in the area and a camera coupled to the PC, and
wherein the work status of each person is analyzed on the basis of an image of the camera and operation logs of the PC, and classified into any one of preliminarily-defined work types.

3. The intra-area environmental control system according to claim 2,
wherein the unit for detecting the work status of each person in the area determines whether or not the person is working on the PC on the basis of analysis of the PC operation logs, identifies a work type on the basis of an operation application if the person is working on the PC, and analyzes the work status on the basis of image analysis if the person is not working on the PC.

4. The intra-area environmental control system according to claim 1,
wherein the control apparatus includes a function of setting a work adaptive condition, as the control policy for the environmental devices, which provides an environment suitable for each person to efficiently carry out the work and a function of calculating control target values of the respective environmental devices, as the control policy for the environmental devices, which satisfy the work adaptive condition, and
wherein the control apparatus combines the controls of the respective environmental devices which satisfy the work adaptive condition in the area on the basis of the calculated evaluation indexes.

5. The intra-area environmental control system according to claim 4,
wherein, in the case where the work status detected by the unit for detecting the work status is a PC operation, the control policies for the environmental devices change the speed of a CPU in accordance with the type of an application being executed.

6. The intra-area environmental control system according to claim 1,
wherein the evaluation indexes include those of a comfort level, an energy saving level, and production efficiency, and control priorities of the respective evaluation indexes and allowable control ranges of the respective evaluation indexes can be set,
wherein the evaluation index calculating and control device determining unit calculates the current evaluation indexes of the respective environmental devices on the basis of the environmental information of the area and the information about the power consumption of the respective environmental devices, and determines a combination of controls of the respective environmental devices adapted to the control policies on the basis of the calculated current evaluation indexes, the set control policies and the work status of each person in the area.

7. The intra-area environmental control system according to claim 6,
wherein the evaluation index calculating and control device determining unit calculates all combinations of controls of the respective environmental devices which satisfy the work adaptive condition in the area.

8. The intra-area environmental control system according to claim 1,
wherein the control apparatus includes a data holding unit having a control table of the respective environmental devices, and
wherein the control table contains control statuses of the respective environmental devices installed in the area to be controlled.

9. The intra-area environmental control system according to claim 1,
wherein the control apparatus includes a database which holds environmental logs and a database which holds power consumption logs, and
wherein the evaluation index calculating and control device determining unit has a function of calculating a comfort level, as the evaluation index, on the basis of the environmental information in the area,
a function of calculating an energy saving level, as the evaluation index, on the basis of the information about the power consumption of the respective environmental devices, and
a function of calculating production efficiency, as the evaluation index, on the basis of the information about the work status of each person in the area.

10. The intra-area environmental control system according to claim 9,
wherein the evaluation index calculating and control device determining unit calculates the energy saving level using Formula 1

$$\text{(energy saving level index)} = 10 \times \left( 1 - \frac{\sum_{n=2}^{p} (\text{power consumption of device } n \text{ per unit time})}{\sum_{n=2}^{p} (\text{theoretical value of the maximum power consumption of device } n \text{ per unit time})} \right) \quad (1)$$

wherein $p$ represents the total number of environmental devices installed in a room to be controlled.

11. The intra-area environmental control system according to claim 9,
wherein the evaluation index calculating and control device determining unit calculates the comfort level index using Formula 2

(i) When a discomfort index $Cm \geq 67.5$, (comfort level index)=$Cm$+(CO2 concentration weighted value)

(iii) When a discomfort index $Cm < 67.5$, (comfort level index)=$Cm$−(CO2 concentration weighted value)

wherein $Cm$ represents a discomfort index $\quad$ (2).

12. The intra-area environmental control system according to claim 9,
wherein the evaluation index calculating and control device determining unit calculates the production efficiency using Formula 4

$$\text{(production efficiency index)} = \frac{\text{(the number of completed operations)}}{\text{(the target number of operations)} \times \text{(work engaging period)}} \quad (4)$$

13. An intra-environmental control system which includes a plurality of environmental devices that control environments in an area, and a control apparatus that monitors conditions in the area to control the respective environmental devices in accordance with the conditions in the area, the system comprising:
- a unit for setting control policies for the respective environmental devices in accordance with a work status in the area on the basis of predetermined evaluation indexes;
- a unit for obtaining information about power consumption of the respective environmental devices;
- a unit for detecting environmental information of the area;
- a unit for detecting the work status of each person in the area;
- an evaluation index calculating and control device determining unit; and
- a display apparatus,
- wherein the control apparatus sets the control policies using scripts, calculates the evaluation indexes of the respective environmental devices on the basis of the environmental information of the area and the information about the power consumption of the respective environmental devices, determines a combination of controls of the respective environmental devices adapted to the control policies on the basis of the calculated evaluation indexes, the set control policies, and the work status of each person in the area to control the respective environmental devices, and presents the scripts for setting the control policies for the respective environmental devices and the calculated evaluation indexes on the display apparatus.

14. The intra-area environmental control system according to claim 13,
- wherein the display apparatus includes an evaluation index condition input user interface, a work adaptive condition input user interface, and an area adaptive condition input user interface for the scripts for setting the control policies.

15. The intra-area environmental control system according to claim 13,
- wherein the scripts presented on the display apparatus include, as definitions, an evaluation index definition for defining an energy saving level index, a comfort level index, and a production efficiency index, a variable definition for defining actual measurement values of the respective indexes calculated on the basis of actual measurement values obtained by the unit for detecting the environmental information of the area, and a control value definition for defining target values of controls in the indoor environment such as a temperature and humidity,
- wherein the scripts is described, as the control policies for the respective environmental devices, an evaluation index condition, a work adaptive condition, and an area adaptive condition,
- wherein the evaluation index condition is described the priorities of the energy saving level index, the comfort level index, and the production efficiency index, and allowable control ranges of the respective indexes,
- wherein the work adaptive condition is described a control condition adapted to the work status of each person, and
- wherein the area adaptive condition is described a control condition adapted to all persons existing in the area.

16. The intra-area environmental control system according to claim 15,
- wherein the actual measurement values of the respective indexes of the comfort level, the energy saving level, and the production efficiency are displayed on the display apparatus while being superimposed on a layout of the respective persons in the area.

17. An intra-area environmental control method for controlling environments in an area by using an intra-area environmental control system including a plurality of environmental devices that control the environments in the area, and a control apparatus that monitors conditions in the area to control the respective environmental devices in accordance with the conditions in the area, the method comprising:
- setting control policies for the respective environmental devices in accordance with a work status in the area on the basis of predetermined evaluation indexes;
- obtaining information about power consumption of the respective environmental devices;
- detecting environmental information of the area;
- detecting the work status of each person in the area;
- calculating the evaluation indexes of the respective environmental devices on the basis of the environmental information of the area and the information about the power consumption of the respective environmental devices;
- determining a combination of controls of the respective environmental devices adapted to the control policies on the basis of the calculated evaluation indexes, the set control policies, and the work status of each person in the area; and controlling the respective environmental devices on the basis of the determined combination.

18. The intra-area environmental control method according to claim 17, the method further comprising:
- setting a work adaptive condition, as the control policy for the environmental devices, which provides an environment suitable for each person to efficiently carry out the work;
- calculating control target values of the respective environmental devices, as the control policy for the environmental devices, which satisfy the work adaptive condition; and
- combining the controls of the respective environmental devices which satisfy the work adaptive condition in the area on the basis of the calculated evaluation indexes.

19. The intra-area environmental control method according to claim 17,
- wherein the evaluation indexes including those of a comfort level, an energy saving level, and production efficiency,
- the method further comprising:
- setting control priorities of the respective evaluation indexes;
- setting allowable control ranges of the respective evaluation indexes;
- calculating the comfort level on the basis of the environmental information in the area;
- calculating the energy saving level on the basis of the information about the power consumption of the environmental devices;
- calculating the production efficiency on the basis of the comfort adapted to the work status of each person in the area and the information about the work status of each person in the area; and
- displaying the comfort level, the energy saving level, and the production efficiency on the display apparatus.

20. The intra-area environmental control method according to claim 19, the method further comprising:
- displaying the actual measurement values of the respective indexes of the comfort level, the energy saving level, and the production efficiency on the display apparatus while superimposing on a layout of the respective persons in the area.

* * * * *